(12) United States Patent
Madsen

(10) Patent No.: US 12,275,149 B2
(45) Date of Patent: Apr. 15, 2025

(54) METHOD OF CONTROLLING A ROBOT ARM BASED ON ADAPTIVE FRICTION

(71) Applicant: Universal Robots A/S, Odense S. (DK)

(72) Inventor: Emil Madsen, Aarhus C (DK)

(73) Assignee: Universal Robots A/S, Odense S (DK)

( * ) Notice: Subject to any disclaimer, the term of this patent is extended or adjusted under 35 U.S.C. 154(b) by 398 days.

(21) Appl. No.: 17/604,066

(22) PCT Filed: Apr. 17, 2020

(86) PCT No.: PCT/DK2020/050101
§ 371 (c)(1),
(2) Date: Oct. 15, 2021

(87) PCT Pub. No.: WO2020/211914
PCT Pub. Date: Oct. 22, 2020

(65) Prior Publication Data
US 2022/0226993 A1    Jul. 21, 2022

(30) Foreign Application Priority Data
Apr. 17, 2019 (DK) .................... 2019 00470

(51) Int. Cl.
*B25J 9/16* (2006.01)
*G05B 19/4155* (2006.01)
*B25J 17/00* (2006.01)

(52) U.S. Cl.
CPC ........ *B25J 9/1641* (2013.01); *G05B 19/4155* (2013.01); *B25J 9/1633* (2013.01);
(Continued)

(58) Field of Classification Search
CPC ........ B25J 9/1641; B25J 9/1633; B25J 17/00; B25J 9/0081; B25J 9/12; B25J 9/1664;
(Continued)

(56) References Cited

U.S. PATENT DOCUMENTS

| 4,763,531 A | 8/1988 | Dietrich et al. |
| 6,212,433 B1 | 4/2001 | Behl |

(Continued)

FOREIGN PATENT DOCUMENTS

| CN | 106233214 | 12/2016 |
| CN | 107921625 | 4/2018 |

(Continued)

OTHER PUBLICATIONS

Written Opinion for International Patent Application No. PCT/DK2020/050101, issued Oct. 22, 2020, (7 pages).

(Continued)

*Primary Examiner* — Sohana Tanju Khayer
(74) *Attorney, Agent, or Firm* — ArentFox Schiff LLP

(57) ABSTRACT

A method of controlling a robot arm with robot joints, where the joint motors of the joints are controlled based on a signal generated based on the friction torque (formula I) of at least one of the input/outside of the robot joint transmission and the robot joint transmission torque (formula II) between the input side and the output side of the transmission. The friction torque is determined based on: at least two of the angular position of the motor axle; the angular position of the output axle and/or the motor torque provided to the motor axle by the joint motor. The robot joint transmission torque is determined based on: at least one of the angular position of the output axle; the angular position of the output axle and/or the angular position of the motor axle; the angular position of the motor axle and the motor torque provided to the motor axle by the joint motor.

20 Claims, 10 Drawing Sheets

(52) U.S. Cl.
CPC ..... *B25J 17/00* (2013.01); *G05B 2219/39186* (2013.01); *G05B 2219/39188* (2013.01); *G05B 2219/40259* (2013.01); *G05B 2219/40269* (2013.01); *G05B 2219/41154* (2013.01)

(58) Field of Classification Search
CPC ...... G05B 19/4155; G05B 2219/39186; G05B 2219/39188; G05B 2219/40259; G05B 2219/40269; G05B 2219/41154; G05B 2219/39181
See application file for complete search history.

(56) References Cited

U.S. PATENT DOCUMENTS

| | | | |
|---|---|---|---|
| 6,212,443 | B1 | 4/2001 | Nagata et al. |
| 7,102,315 | B2 | 9/2006 | Nakata et al. |
| 10,331,107 | B2 | 6/2019 | Moberg |
| 10,399,232 | B2 | 9/2019 | Oestergaard et al. |
| 10,631,941 | B2 | 4/2020 | Hashimoto et al. |
| 10,850,393 | B2 | 12/2020 | Oestergaard et al. |
| 11,260,543 | B2 | 3/2022 | Johansen |
| 11,474,510 | B2 | 10/2022 | Oestergaard et al. |
| 11,796,045 | B2 | 10/2023 | Johansen |
| 11,839,979 | B2 | 12/2023 | Rosenlund et al. |
| 11,964,389 | B2 | 4/2024 | Johansen |
| 12,011,824 | B2 | 6/2024 | Vraa et al. |
| 2006/0071625 | A1* | 4/2006 | Nakata ................ B25J 9/1633 318/568.12 |
| 2010/0234999 | A1* | 9/2010 | Nakajima .............. B25J 9/1628 700/245 |
| 2011/0224826 | A1 | 9/2011 | Maehara et al. |
| 2012/0116582 | A1* | 5/2012 | Negishi ................. B25J 9/1656 700/245 |
| 2012/0130541 | A1 | 5/2012 | Szalek |
| 2013/0073084 | A1 | 3/2013 | Ooga et al. |
| 2013/0073085 | A1 | 3/2013 | Oaki et al. |
| 2013/0079928 | A1 | 3/2013 | Østergaard et al. |
| 2013/0231778 | A1 | 9/2013 | Østergaard |
| 2013/0255426 | A1 | 10/2013 | Kassow et al. |
| 2015/0204742 | A1 | 7/2015 | Draisey |
| 2016/0067865 | A1 | 3/2016 | Osada et al. |
| 2017/0080562 | A1* | 3/2017 | Tsuzaki ................. B25J 13/085 |
| 2017/0128136 | A1* | 5/2017 | Post ....................... A61B 34/76 |
| 2017/0190049 | A1* | 7/2017 | Wada ......................... B25J 9/10 |
| 2018/0079090 | A1* | 3/2018 | Koenig ..................... G01L 3/14 |
| 2018/0200886 | A1* | 7/2018 | Wang ..................... B25J 9/1653 |
| 2018/0207798 | A1* | 7/2018 | Tsuzaki ................. B25J 13/085 |
| 2019/0091861 | A1 | 3/2019 | Kasai et al. |
| 2020/0171657 | A1* | 6/2020 | Baier ..................... B25J 9/1664 |
| 2020/0171658 | A1 | 6/2020 | Kielsholm Thomsen |
| 2020/0189102 | A1* | 6/2020 | Sasajima ................ B25J 9/1641 |
| 2021/0086374 | A1 | 3/2021 | Brandt et al. |
| 2021/0315652 | A1* | 10/2021 | Henrywood ........... A61B 34/74 |
| 2022/0161433 | A1 | 5/2022 | Brandt et al. |
| 2022/0184810 | A1 | 6/2022 | Brandt et al. |
| 2022/0379463 | A1 | 12/2022 | Hansen |
| 2022/0379468 | A1 | 12/2022 | Hansen |
| 2022/0388156 | A1 | 12/2022 | Hansen |
| 2023/0035296 | A1 | 2/2023 | Søe-Knudsen et al. |
| 2023/0052996 | A1 | 2/2023 | Thomsen |
| 2023/0191603 | A1 | 6/2023 | Thomsen et al. |
| 2023/0405819 | A1 | 12/2023 | Kravchenko et al. |
| 2023/0405822 | A1 | 12/2023 | Kravchenko et al. |
| 2023/0418258 | A1 | 12/2023 | Mirth |
| 2024/0351209 | A1 | 10/2024 | A/S |

FOREIGN PATENT DOCUMENTS

| | | |
|---|---|---|
| CN | 108698223 A | 10/2018 |
| CN | 108883534 | 11/2018 |
| CN | 109108954 | 1/2019 |
| EP | 1173801 A1 | 1/2002 |
| EP | 1652834 A1 | 5/2006 |
| WO | 2014/110682 A1 | 7/2014 |
| WO | 2017/144310 A1 | 8/2017 |
| WO | 2019238940 A1 | 12/2019 |

OTHER PUBLICATIONS

International Search Report for International Patent Application No. PCT/DK2020/050101, issued Oct. 22, 2020, (4 pages).
International Preliminary Report on Patentability for International Patent Application No. PCT/DK2020/050101, issued Oct. 19, 2021, (8 pages).
Ruderman M et al: "Modeling and Identification of Elastic Robot Joints With Hysteresis and Backlash", IEEE Transactions on Industrial Electronics, IEEE Service Center, Piscataway, NJ, USA, vol. 56, No. 10, Oct. 1, 2009 (Oct. 1, 2009), pp. 3840-3847, XP011267652, ISSN: 0278-0046, DOI: 10.1109/TIE.2009.2015752.
Lee Chan et al: "A two-staged residual for resilient external torque estimation with series elastic actuators", 2017 IEEE-RAS 17th International Conference on Humanoid Robotics (Humanoids), IEEE, Nov. 15, 2017 (Nov. 15, 2017), pp. 817-823, XP033291678, DOI: 10.1109/HUMANOIDS.2017.8246966 [retrieved on Jan. 4, 2018].
Lightcap C et al: "Dynamic identification of a Mitsubishi pa10-6ce robot using motion capture", Intelligent Robots and Systems, 2007. IROS 2007. IEEE/ RSJ International Conference on, IEEE, Piscataway, NJ, USA, Oct. 29, 2007 (Oct. 29, 2007), pp. 3860-3865, XP031222424, ISBN: 978-1-4244-0911-2.
First Office Action in Chinese Application No. 202080028536.8 dated Sep. 26, 2023 (with English Summary), 12pages.
Albu-Schaffer et al., The DLR Lightweight Robot—Design and Control Concepts for Robots in Human Environments.
Bona et al., Friction Compensation in Robotics: an Overview. Proc 44th IEEE Conf Dec Cont ECC 2005. Spain. Dec. 12-15, 2005: 4360-7.
Canudas-de-Wit et al., Adaptive Friction Compensation in DC-Motor Drives. IEEE J Robot Automat. Dec. 1987. RA-3 (6): 681-5.
Kawakami et al., High-Fidelity Joint Drive System by Torque Feedback Control Using High Precision Linear Encoder. 2010 IEEE Int Conf Robot Automat. Alaska, USA. May 3-8, 2010; 3904-9.
Le Tien et al., Friction Observer and Compensation for Control of Robots with Joint Torque Measurement. 2008 IEEE/ Rsj Int Conf Intel Robot Syst. France. Sep. 22, 2008-6; 3789-95.
Spong, Modeling and Control of Elastic Joint Robots. Trans ASME. Dec. 1987; 109: 310-9.
Susanto et al. Proc 17th World Congress: Int Fed Automat Cont. Korea. 2008; Jul. 6-11; 2020-4.
Aghili et al., "Motion control systems with/spl Hscr//sup/spl infin// positive joint torque feedback", IEEE Transactions on Control Systems Technology, vol. 9, No. 5, 2001, pp. 685-695.
Canudas et al., "Adaptive Friction Compensation in Robot Manipulators: Low Velocities", The International Journal of Robotics Research, vol. 10, No. 3, 1991, pp. 189-199.
File History received for European Patent Application No. 20743583.5, downloaded on Jan. 6, 2025, 317 pages.
Hashimoto et al., "A torque sensing technique for robots with harmonic drives", IEEE Transactions on Robotics and Automation, vol. 9, No. 1, 1993, pp. 108-116.
Search Report and search opinion received for Danish Patent Application No. PA 201900470 mailed on Nov. 8, 2019, 10 pages.
Sensinger et al., "Improved torque fidelity in harmonic drive sensors through the union of two existing strategies", IEEE/ASME Transactions on Mechatronics, vol. 11, No. 4, Aug. 2006, pp. 457-461.
Universal Robots., "User Manual UR3/CB3", Version 3.1, 2009, 181 pages.
Zhang et al., "Torque estimation for robotic joint with harmonic drive transmission based on position measurements", IEEE Transactions on Robotics, vol. 31, No. 2, 2015, pp. 322-330.
Zhang et al., "Torque estimation technique of robotic joint with harmonic drive transmission", IEEE International Conference on Robotics and Automation. IEEE, 2013, 6 pages.
Zhu et al., "Adaptive control of harmonic drives", vol. 129, 2007, pp. 182-193.

(56) References Cited

OTHER PUBLICATIONS

Franklin et al., "Feedback Control of Dynamic Systems", Eighth edition, Pearson, 2019.

* cited by examiner

METHOD OF CONTROLLING A ROBOT ARM BASED ON ADAPTIVE FRICTION

CROSS-REFERENCE TO RELATED APPLICATIONS

This application is a national stage entry of PCT Application No. PCT/DK2020/050101, which was filed on Apr. 17, 2020. PCT Application No. PCT/DK2020/050101 claims priority to Denmark Patent Application No. PA201900470 which was filed on Apr. 17, 2019. This application claims priority to PCT Application No. PCT/DK2020/050101 and to Denmark Patent Application No. PA201900470. The contents of PCT/DK2020/050101 and Denmark Patent Application No. PA201900470 are incorporated herein by reference.

FIELD OF THE INVENTION

The present invention relates to methods of controlling a robot arm comprising a plurality of robot joints connecting a robot base and a robot tool flange, where at least one of the robot joints is a rotational robot joint comprising a joint motor having a motor axle, where the motor axle is configured to rotate an output axle of the rotational robot joint via a robot joint transmission.

BACKGROUND OF THE INVENTION

Robot arms comprising a plurality of robot joints and links where motors can rotate the joints in relation to each other are known in the field of robotics. Typically, the robot arm comprises a robot base which serves as a mounting base for the robot arm and a robot tool flange where to various tools can be attached. A robot controller is configured to control the robot joints to move the robot tool flange in relation to the base. For instance, in order to instruct the robot arm to carry out a number of working instructions.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a geometric relationship between the different parts of the robot arm and may comprise information of the robot arm such as, length, size of the joints and links and can for instance be described by Denavit-Hartenberg parameters or the like. The dynamic model makes it possible for the controller to determine which torques the joint motors shall provide in order to move the robot joints for instance at specified positions, velocities, and accelerations.

On many robot arms it is possible to attach various end effectors to the robot tool flange, such as grippers, vacuum grippers, magnetic grippers, screwing machines, welding equipment, dispensing systems, visual systems etc.

In some robots the robot joint comprises a joint motor having a motor axle configured to rotate an output axle, for instance via a transmission system. The robot joint transmission system is configured to transmit torque provided by the motor axle to the output axle. Typically, the output axle is connected to and configured to rotate parts of the robot arm in relation to each other. The robot joint transmission system can for instance comprise a robot joint gear or a direct drive mechanism. The robot joint gear can for instance be provided as a spur gears, planetary gears, bevel gears, worm gears, strain wave gears or other kind of transmission systems.

Commonly flexibility and friction exist in the various types of transmissions. Taking into account the friction of the transmission in the dynamic model makes the dynamic model more accurately resemble the dynamics of the real robot arm because the robot joint friction originating from the transmission system can be known and thereby compensated in the robot controller. The art of compensating the effects of friction in the controller is well known in the field of motor control {1}. A more accurate dynamic model can for instance allow the robot controller to control the robot arm with greater accuracy and precision. A more accurate dynamic model can also allow the robot controller to more accurately identify external disturbances, for instance human interference which is of great concern in terms of safety.

One issue when taking into account the robot joint friction in the robot controller design is that the friction changes in a manner that is difficult to predict accurately. For instance, friction is known to change with quantities such as temperature and wear that are hardly measurable on most industrial robots. The friction's temperature dependency is caused for instance by the thermal expansion of mechanical parts in contact and/or temperature-dependent lubricant properties. The friction's wear dependency is caused for instance by material being worn off at contacting surfaces such as for instance at the gear meshing in a robot joint gear.

Due to the variation of the robot joint friction it is desired to estimate the friction on-line, such that the friction can be compensated more accurately in the robot controller. The art of adaptive friction compensation is well known within the field of motor control. Adaptive friction compensation has been accomplished through various strategies by several researchers {2}, {3}, {4}.

There are several robot control strategies that utilizes the knowledge on the dynamic model of the industrial robot to compute the control action. The control strategy Joint Torque Feed-back (JTF) has been widely used to improve the performance of robot motion and force control {5}, {6}, {7}. Implementation of JTF control requires to know the joint torque transmitted to the output axle from the transmission system. The joint transmission torque is most often obtained by measuring the deformation of an elastic member inside the transmission. If for instance strain wave transmissions are used as robot joint gears the joint transmission torque can be obtained for instance by mounting strain gauges on the flex spline {8}, {9}, {10}. Another option is to measure the angular position of both the input axle and the output axle in the robot joint. The difference between these position measurements defines the deformation of the transmission system. This deformation combined with an accurate mathematical model of the transmission system can yield an estimate of the robot joint transmission torque as shown in {11}, {12}, {13}. However, while these works demonstrate sufficient accuracy in the experimental test systems during a maximum period of 80 seconds, the methods are deemed to fail if applied to industrial robots where changes in ambient conditions or changes in the temperature or wear level of the robot joint transmission system occurs and influences the industrial robot's friction characteristics.

EP165264A1 discloses a method and device of controlling a robot arm driven by a motor, a technique of compliance servo control of controlling a robot arm, and a method and device of controlling a stoppage of a robot arm conducted after a collision of the robot arm against an object has been detected. A frictional torque of the robot joint is calculated based on the motor angular velocity, which is obtained based on the largest one of a feed-back motor angular velocity or a desired motor angular velocity.

REFERENCES

{1} B. Bona and M. Indri (2005). "Friction Compensation in Robotics: An Overview," Proc. 44*th IEEE Conference on Decision and Control, Seville*, Spain, Dec. 15, 2005.
{2} C. Canudas-de-Wit et al. (1987). "Adaptive friction compensation in dc-motor drives," *IEEE Journal on Robotics and Automation*, Vol. 3, No. 6, pp. 681-685.
{3} C. Canudas-de-Wit et al. (1991). "Adaptive Friction Compensation in Robot Mdnipulators: Low Velocities," *The International Journal of Robotics Research*, Vol. 10, No. 3, pp. 189-199.
{4} W. Susanto et al. (2008). "Adaptive Friction Compensation: Application to a Robotic Mdnipulator," *IFAC Proceedings Volumes*, Vol. 41, No. 2, pp. 2020-2024.
{5} F. Aghili and M. Buehler and J. M. Hollerbach (2001). "Motion control systems with/spl Hscr//sup/spl infin// positive joint torque Feedback," *IEEE Transactions on Control Systems Technology*, Vol. 9, No. 5, pp. 685-695.
{6} L. Le Tien et al. (2008). "Friction observer and compensation for control of robots with joint torque measurement," *IEEE/RSJ International Conference on Intelligent Robots and Systems*, Nice, France, Sep. 22-26, 2008, pp. 3789-3795.
{7} A. Albu-Schäffer et al. (2007). "The DLR lightweight robot: design and control concepts for robots in human environments," *Industrial Robot: An International Journal*, Vol. 34, No. 5, pp. 376-385.
{8} M. Hashimoto et al. (1993). "A Torque Sensing Technique for Robots with Harmonic Drives," *IEEE Transactions on Robotics and Automation*, Vol. 9, No. 1, pp. 108-116.
{9} W.-H. Zhu et al. (2006). "Adaptive Control of Harmonic Drives," *Journal of Dynamic Systems, Measurement, and Control*, Vol. 129, No. 2, pp. 182-193.
{10} J. W. Sensinger and R. F. ff. Weir (2006). "Improved Torque Fidelity in Harmonic Drive Sensors Through the Union of Two Existing Strategies," *IEEE/ASME Transactions on Mechatronics*, Vol. 11, No. 4, pp. 457-461.
{11} T. Kawakami et al. (2010). "High-Fidelity Joint Drive System by Torque Feedback Control Using High Precision Linear Encoder," *IEEE International Conference on Robotics & Automation*, Anchorage, Alaska, USA, Mdy 3-8, 2010.
{12} H. Zhang et al. (2013). "Torque Estimation Technique of Robotic Joint with Harmonic Drive Transmission," *IEEE International Conference on Robotics & Automation*, Karlsruhe, Germany, Mdy 6-10, 2013.
{13} H. Zhang et al. (2015). "Torque Estimation for Robotic Joint with Harmonic Drive Transmission Based on Position Measurements," *IEEE Transactions on Robotics*, Vol. 31, No. 2, pp. 322-330.
{14} M. W. Spong (1987). "Modeling and Control of Elastic Joint Robots," *Journal of Dynamic Systems, Measurement, and Control*, vol. 109, no. 4, pp. 310-319.
{15} Gene F. Franklin, J. David Powell, and Abbas Emami-Naeini. "Feedback Control of Dynamic Systems", 8th Edition. Pearson, 2018.

SUMMARY OF THE INVENTION

The objective of the present invention is to address the above described limitations with the prior art or other problems of the prior art. This is achieved by a method of controlling a robot arm with robot joints, where the joint motors of the joints are controlled based on a signal generated based on the friction torque $\hat{F}$ of the input side and/or output side of the robot joint transmission and the robot joint transmission torque $\hat{\tau}_j$ between the input side and the output side of the transmission. The friction torque is determined based on: at least two of the angular position of the motor axle; the angular position of the output axle and/or the motor torque provided to the motor axle by the joint motor. The robot joint transmission torque is determined based on: at least one of the angular positions of the output axle; the angular position of the output axle and/or the angular position of the motor axle; the angular position of the motor axle and the motor torque provided to the motor axle by the joint motor. This makes it possible to provide a more accurate control of a robot arm as the friction torque of the joint transmissions can be adaptively obtained and used to generate the controls signals of the robot joint motors. Further the objective of the present invention is addressed by a robot arm comprising a plurality of robot joints and a robot controller where the robot controller is configured to control the robot arm based on an adaptively obtained friction torque of the robot joint transmission. The dependent claims describe possible embodiments of the method according to the present invention. The advantages and benefits of the present invention are described in the detailed description of the invention

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
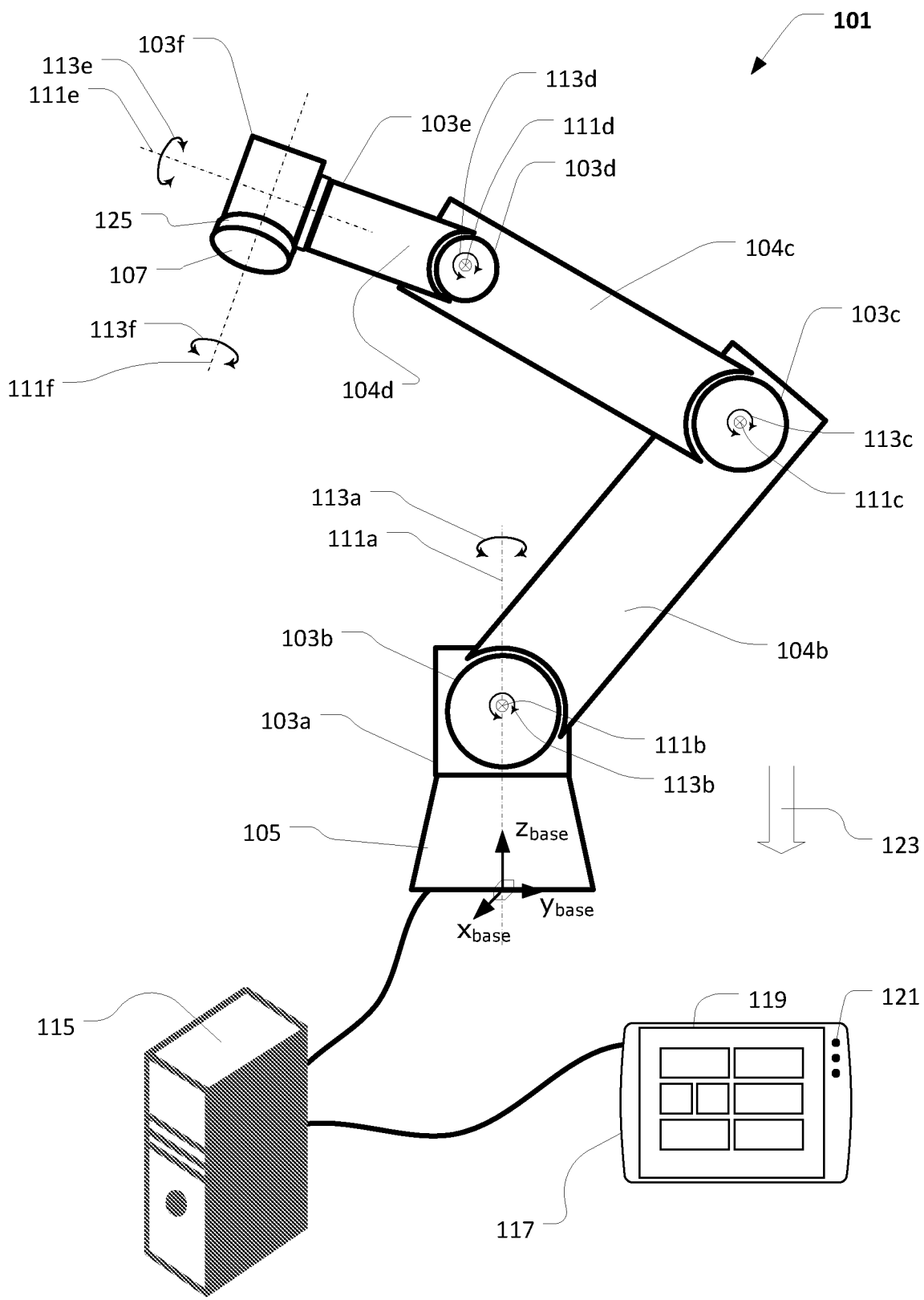
FIG. 1 illustrates a robot arm configured according to the present invention.

The invention can be embodied into a robot arm and is described in view of the robot arm illustrated in FIG. 1. The robot arm 101 comprises a plurality of robot joints 103a, 103b, 103c, 103d, 103e, 103f and robot links 104b, 104c, 104d connecting a robot base 105 and a robot tool flange 107. A base joint 103a is connected directly with a shoulder joint and is configured to rotate the robot arm around a base axis 111a (illustrated by a dashed dotted line) as illustrated by rotation arrow 113a. The shoulder joint 103b is connected to an elbow joint 103c via a robot link 104b and is configured to rotate the robot arm around a shoulder axis 111b (illustrated as a cross indicating the axis) as illustrated by rotation arrow 113b. The elbow joint 103c is connected to a first wrist joint 103d via a robot link 104c and is configured to rotate the robot arm around an elbow axis 111c (illustrated as a cross indicating the axis) as illustrated by rotation arrow 113c. The first wrist joint 103d is connected to a second wrist joint 103e via a robot link 104d and is configured to rotate the robot arm around a first wrist axis 111d (illustrated as a cross indicating the axis) as illustrated by rotation arrow 113d. The second wrist joint 103e is connected to a robot tool joint 103f and is configured to rotate the robot arm around a second wrist axis 111e (illustrated by a dashed dotted line) as illustrate by rotation arrow 113e. The robot tool joint 103f comprising the robot tool flange 107, which is rotatable around a tool axis 111f (illustrated by a dashed dotted line) as illustrated by rotation arrow 113f. The illustrated robot arm is thus a six-axis robot arm with six degrees of freedom, however it is noticed that the present invention can be provided in robot arms comprising less or more robot joints, and the robot joints can be connected directly to the neighbor robot joint or via a robot link. In the illustrated embodiment the robot joints are illustrated as rotational robot joints where a rotational robot joint rotates one part of the robot arm in relation to another part of the robot joint, however it is to be understood that some of the robot joint may be provided as translational robot joints where the robot joint is configured to move a part of the robot arm in relation to another part of a robot arm via a translational movement. For instance, such translational robot joint may be provided as a prismatic robot joint. It is to be understood that the robot joints can be identical and/or different. The direction of gravity 123 is also indicated in the figure.

The robot arm comprises at least one robot controller 115 configured to control the robot joints by controlling the motor torque provided to the joint motors based on a dynamic model of the robot. The robot controller 115 can be provided as a computer comprising an interface device 117 enabling a user to control and program the robot arm. The controller can be provided as an external device as illustrated in FIG. 1 or as a device integrated into the robot arm.

The interface device can for instance be provided as a teach pendent as known from the field of industrial robots which can communicate with the controller via wired or wireless communication protocols. The interface device can for instance comprise a display 119 and a number of input devices 121 such as buttons, sliders, touchpads, joysticks, track balls, gesture recognition devices, keyboards etc. The display may be provided as a touch screen acting both as display and input device.

Figure 2:
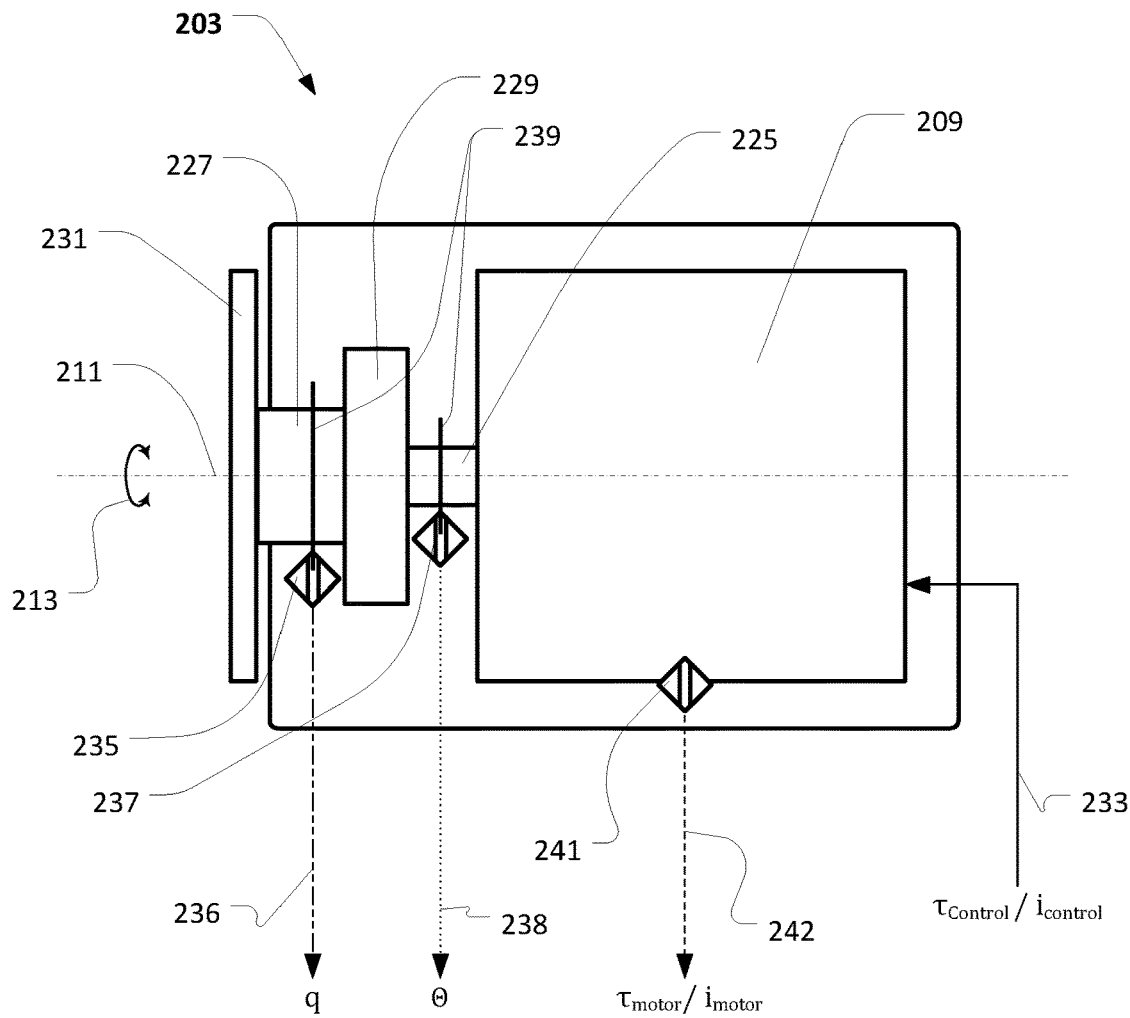
FIG. 2 illustrates a schematic cross-sectional view of a rotational robot joint.

FIG. 2 illustrates a schematic cross-sectional view of a rotational robot joint 203. The schematic robot joint 203 can reflect any of the robot joints 103a-103f of the robot 101 of FIG. 1. The robot joint comprises a joint motor 209 having a motor axle 225. The motor axle 225 is configured to rotate an output axle 227 via a robot joint transmission 229. The robot joint transmission can be any device transferring the rotation of the motor axle to the output axle and may for instance be provided as a direct drive where the motor axle is directly coupled with the output axle and the motor axle and output may thus be the same. The robot joint transmission may also be provided as a robot joint gear providing a ratio between the motor axle and the output axle, for instance in order to increase the rotational torque provided by the output axle. The robot joint gear can be provided as any kind of gear mechanism such as strain wave gears, planet gears, epicyclic gears, spur gears, bevel gears etc. and may be provided as single stager or multi stage gear systems. The output axle 227 rotates around an axis of rotation 211 (illustrated by a dot-dash line) and can be connected to a neighbor part (not shown) of the robot arm. Consequently, the neighbor part of the robot arm can rotate in relation to the robot joint 203 around the axis of rotation 211 as illustrated by rotation arrow 213. In the illustrated embodiment the robot joint comprises an output flange 231 connected to the output axle and the output flange can be connected to a neighbor robot joint or an arm section of the robot arm. However, the output axle can be directly connected to the neighbor part of the robot arm or by any other way enabling rotation of the neighbor part of the robot by the output axle.

The joint motor 209 is configured to rotate the motor axle by applying a motor torque to the motor axle as known in the art of motor control, for instance based on a motor control signal 233 indicating the torque, $T_{control}$ applied by the motor axle, for instance by driving the joint motor with a motor current $i_{motor}$ proportional with a motor torque. The robot transmission 229 is configured to transmit the torque provided by the motor axle to the output axle for instance to provide a gear ratio between the motor axle and the output axle. The robot joint comprises at least one joint sensor providing a sensor signal indicative of at least the angular position, q, of the output axle and an angular position, $\Theta$, of the motor axle. For instance, the angular position of the output axle can be indicated by an output encoder 235, which provide an output encoder signal 236 indicating the angular position of the output axle in relation to the robot joint. Similar, the angular position of the motor axle can be provided by an input encoder 237 providing an input encoder signal 238 indicating the angular position of the motor axle in relation to the robot joint. The output encoder 235 and the input encoder 237 can be any encoder capable of indicating the angular position, velocity and/or acceleration of respectively the output axle and the motor axle. The output/input encoders can for instance be configured to obtain the position of the respective axle based on the position of an encoder wheel 239 arrange on the respective axle. The encoder wheels can for instance be optical or magnetic encoder wheels as known in the art of rotary encoders. The output encoder indicating the angular position of the output axle and the input encoder indicating the angular position of the motor axle makes it possible to determine a relationship between the input side (motor axle) and the output side (output axle) of the robot joint gear.

The robot joints may optionally comprise one or more motor torque sensors 241 providing a motor torque signal 242 indicating the torque provided by the motor axle. For instance, the motor torque sensor can be provided as current sensors obtaining the current $i_{motor}$ through the coils of the joint motor whereby the motor torque can be determined as known in the art of motor control. For instance, in connection with a multiphase motor, a plurality of current sensors can be provided in order to obtain the current through each of the phases of the multiphase motor and the motor torque can then be obtained based on the obtained currents. For instance, in a three-phase motor the motor torque may be obtained based on quadrature current obtained from the phase currents through a Park Transformation. Alternatively, the motor torque can be obtained using other kind of sensors for instance force-torque sensors, strain gauges etc.

Figure 3:
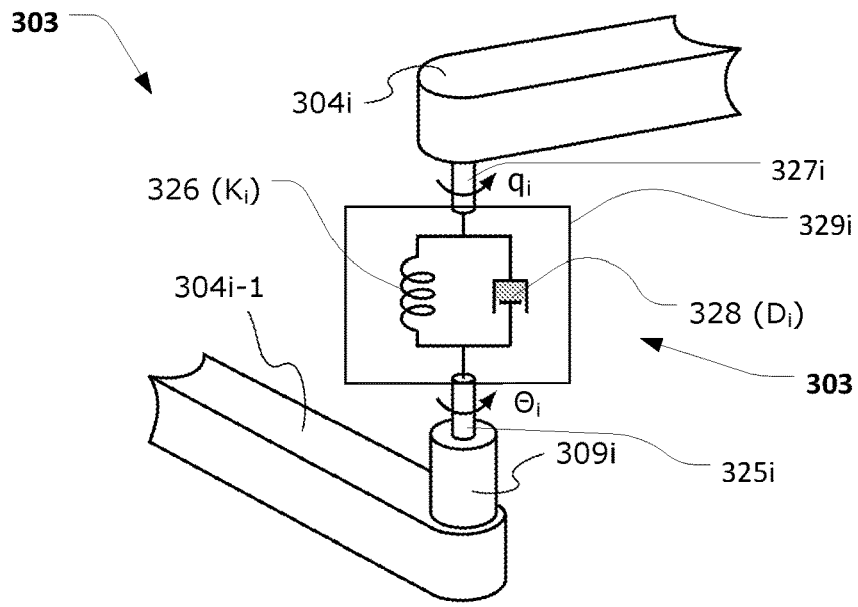
FIG. 3 illustrates a model of a rotational robot joint gear.

FIG. 3 illustrates a model of a rotational robot joint 303 connecting robot link 304$i$–1 and robot link 304$i$, where the joint motor 309$i$ is arranged on robot link 304$i$–1 and rotates robot link 304$i$ in relation to robot link 304$i$–1. The motor axle 325$i$ of the joint motor is connected to an output axle 327$i$ via robot joint transmission 329$i$ (illustrated in schematic form) and the robot link 304$i$ rotates together with the output axle 327$i$. The robot joint transmission provides a transmission ratio between the motor axle and the output axle and in an infinitely stiff transmission the rotation of the motor axle is immediately transformed into rotation of the output axle according to the transmission ratio of the robot joint transmission. However as described in the background of the invention flexibility exist in the types of robot joint transmissions used in the field of robot arms. The flexibility of a robot joint transmission can be indicated by the transmission stiffness of the robot joint transmission which defines a relationship between torque through the robot joint transmission and the deformation between the input side (motor axle) and the output side (output axle) of the robot joint transmission. The flexibility of a robot joint transmission can be represented as a spring 326 and a damper 328 coupled in parallel between the input side (motor axle) and the output side (output axle) of the robot joint transmission. The stiffness $K_i$ of the spring indicates the transmission stiffness of the robot joint transmission and the damping $D_i$ of the damper indicates the damping of the robot joint transmission.

Figure 4:
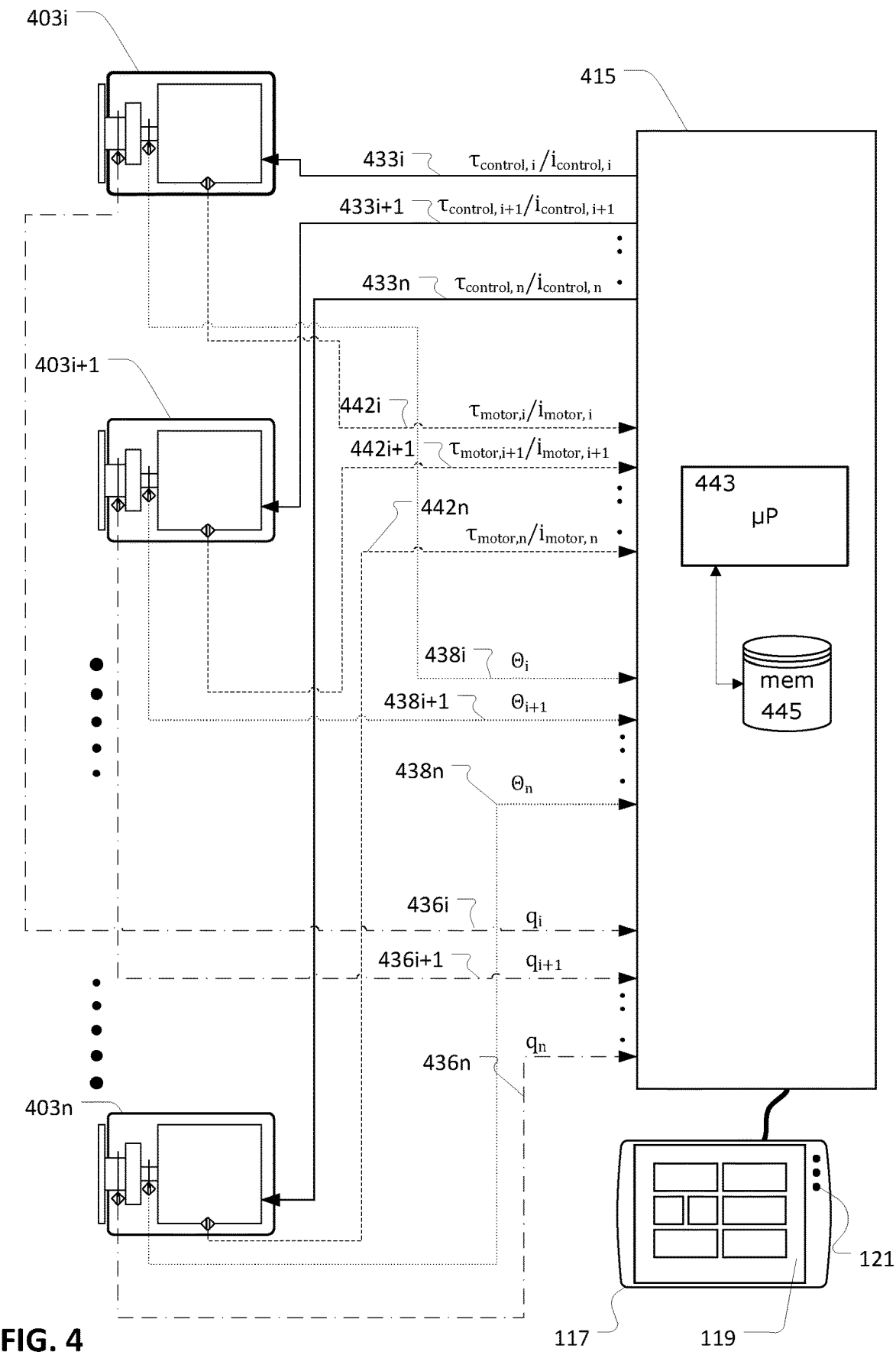
FIG. 4 illustrates a simplified structural diagram of a robot arm configured according to the present invention.

FIG. 4 illustrates a simplified structural diagram of a robot arm comprising a plurality of n number of robot joints 403$i$, 403$i$+1 . . . 403$n$. The robot arm can for instance be embodied like the robot arm illustrated in FIG. 1 with a plurality of interconnected robot joints, where the robot joints can be embodied like the rotational robot joint illustrated in FIG. 2. It is to be understood that some of the robot joints and robot links between the robot joints have been omitted for sake of simplicity. The controller is connected to an interface device comprising a display 119 and a number of input devices 121, as described in connection with FIG. 1. The robot controller 415 comprises a processor 443, a memory 445 and at least one input and/or output port enabling communication with at least one peripheral device.

The robot controller is configured to control the robot arm based on a dynamic model of the robot arm $D_{robot}$. The dynamic model of the robot arm can be defined and prestored in the memory 445 of the controller and the user can in some embodiment be allowed to modify the dynamic model op the robot arm, for instance by providing payload information of a payload attached to the robot arm or defining the orientation of the robot arm in relation to gravity.

The configuration of the robot arm can be characterized by the generalized coordinates (q Θ)∈$R^{2N}$ where q is a vector comprising the angular positions of the output axles of the robot joint transmissions and Θ is a vector comprising the angular positions of the motor axles as seen in the output side of the robot joint transmission. Consequently:

$$\Theta = \frac{\Theta'}{r} \qquad \text{eq. 1}$$

where Θ' is the actual angular position of the motor axle, which can for instance be measured by a rotary encoder, and r the gear ratio of the robot joint transmission. This is the notation used throughout this application.

Alternatively, it is noted that q can be indicated in the input side of the robot joint gear:

$$q = q'r \qquad \text{eq. 2}$$

where q' is the actual angular position of the output axle, which can for instance be measured by a rotary encoder.

The transmission flexibility of the robot joint results in a deflection between the input side and the output side of the robot joint transmission when a torque is applied to the robot joint transmission. The deflection of the robot joint transmission can be indicated by a joint transmission deformation variable $\phi_{joint}$ indicating the differences between the angular position Θ of the motor axle and the angular position q of the output axle, thus the joint transmission deformation for robot joint i is defined as:

$$\Phi_{joint,i} = \Theta_i - q_i \qquad \text{eq. 3}$$

The joint transmission torque $\tau_{joint,i}$ defines the torque that is transferred from the motor axle to the output axle via the robot joint transmission and can be modeled as a function of the joint transmission deformation $\Phi_{joint}$ and its time-derivative:

$$\tau_{joint,i}(\phi_{joint,i}, \dot\phi_{joint,i}) = \tau_{E,i}(\phi_{joint,i}) + \tau_{D,i}(\dot\phi_{joint,i}) \qquad \text{eq. 4}$$

where $\tau_{E,i}(\phi_{joint,i})$ is a flexibility torque depending on the robot joint transmission stiffness $K_i$ and the joint transmission deformation of the robot joint transmission and $\tau_{D,i}(\dot\phi_{joint,i})$ is a damping torque depending on the damping $D_i$ and the first time derivative of the joint transmission deformation of the robot joint transmission.

The transmission stiffness $K_i$ of the robot joint transmission can be characterized by how much the flexibility torque $\tau_{E,i}(\phi_{joint,i})$ causing the joint transmission deformation changes as a function of the joint transmission deformation. The transmission stiffness can thus be expressed as:

$$K_i(\Phi_{joint,i}) = \frac{\partial \tau_{E,i}(\Phi_{joint,i})}{\partial \Phi_{joint,i}} \approx \frac{\Delta \tau_{E,i}(\Phi_{joint,i})}{\Delta \Phi_{joint,i}} \qquad \text{eq. 5}$$

The flexibility torque $\tau_{E,i}(\phi_{joint,i})$ of the robot joint transmission can be obtained experimentally, for instance by following these steps:

Impose a set of different known torques around the rotational axis (111$a$-111$f$, 211) of the robot joints and for each torque obtain the resulting joint transmission deformation $\phi_{joint}$ based on obtained/measured the angular positions of the input axle and output axle using eq. 3. The torques can be exerted to the robot joint for instance by;

orienting the joint rotation axis parallel to the direction of the gravitational acceleration such that there will be no torque resulting from gravity, and then;

using a device capable of measuring force to exert a force on the robot arm, the force being exerted at a position with a known distance between the applied force and the joint axis, the distance being perpendicular to the direction of the exerted force and perpendicular to the joint rotation axis, and then calculating the torque as force times distance;

letting part of the robot, for instance the tool flange, exert a force/torque on its surroundings and using the kinematic properties of the robot arm and the actual configuration of the robot arm to calculate the torque around the joint rotation axis.

Based on the experimental results a mathematical model of the relationship between the joint transmission deformation and the flexibility torque for joint i can be constructed, for instance a polynomial of odd powers in $\phi_{joint,i}$ can be used to describe the relationship between the joint transmission deformation and the flexibility torque for joint i, thus $$\tau_{E,i}(\Phi_{jointi}) = [\Phi_{joint,i} \ \Phi_{joint,i}^3 \ \ldots \ \Phi_{joint,i}^{2P-1}] \cdot \begin{bmatrix} k_{1,i} \\ k_{2,i} \\ \vdots \\ k_{P,i} \end{bmatrix} \qquad \text{eq. 6}$$

where $k_{j,i}$ is $j^{th}$ polynomial coefficient and P is the total number of polynomial coefficients.

The $\tau_{D,i}(\dot\phi_{joint,i})$ damping torque of the robot joint transmission can, if assumed linear in the time-derivative of joint transmission deformation, for instance be obtained by following the steps:

Fix the output axle of the robot joint transmission;

Apply a torque to the motor axle of the robot joint transmission to yield a transmission deflection of the joint transmission;

Keep the motor axle of the robot joint transmission still and remove the applied torque From the motor axle of the robot joint transmission;

Observe the position of the motor axle of the robot joint transmission over time as the motor axle of the robot joint transmission undergoes a damped harmonic motion with an amplitude that decreases over time.

The damping torque is a measure of the energy dissipation during the motion. Assuming an underdamped harmonic motion, the damping coefficient $D_i$ can be obtained as:

$$D_i = \frac{-2B \log_e\left(\frac{A_2}{A_1}\right)}{t_2 - t_1} \qquad \text{eq. 7}$$

where B is the mass moment of inertia of the motor axle, $A_1$ and $A_2$ are, respectively, amplitudes of the first and second vibration, and $t_1$ and $t_2$ are, respectively, times for the first and second motion.
If the motion is not underdamped, a larger mass moment of inertia is added to the input axle.

The output-side friction torque $F_q$ of the transmissions of robot joints can be obtained experimentally, for instance by following these steps for each of the robot joints independently:

Orient the rotation axis (111a-111f, 211) of a robot joint parallel to the direction of the gravitational acceleration.

Apply motor torque such as to rotate the output axle of the robot joint with different known constant angular velocities in a known period of time while measuring the joint transmission deformation.

The output-side friction torque is obtained as the joint transmission deformation mapped to flexibility torque during the constant angular velocity motion of the output axle, thus $$F_{q,i} = \tau_{E,i}(\phi_{joint,i}) \qquad \text{eq. 8}$$

The input-side friction torque Fo of the robot joint transmission can be obtained experimentally, for instance by following these steps for each of the robot joints independently:

Orient the robot joint axis rotation axis (111a-111f, 211) parallel to the direction of the gravitational acceleration;

Apply motor torque such as to rotate the motor axle of the robot joint with a known constant angular velocity in a known period of time while obtaining the joint motor torque, for instance based on motor currents.

The input-side friction torque is obtained as the joint motor torque during the constant angular velocity motion of the motor axle as a function of the flexibility torque, thus $$F_{\theta,i} = \tau_{motor,i} - \tau_{E,i}(\phi_{joint,i}) \qquad \text{eq. 9}$$

Facing FIG. 4 the robot controller is configured to control the joint motors of the robot joints by providing motor control signals to the joint motors. The motor control signals 433i, 433i+1 . . . 433n are indicative of the motor torque $\tau_{control,i}$, $\tau_{control,i+1}$, and $\tau_{control,n}$, that each joint motor shall provide to the motor axles; alternatively, the motor control signal may be provided as or indicate the current $i_{control,i}$, $i_{control,i+1}$, and $i_{control,n}$ that each joint motor shall provide. The motor control signals can indicate the desired motor torque, the desired torque provided by the output axle, the currents provided by the motor coils or any other signal from which the motor torque can be obtained. The motor torque signals can be sent to a motor control driver (not shown) configured to drive the motor joint with the motor current resulting in the desired motor torque. The robot controller is configured to determine the motor torque based on a dynamic model of the robot arm as known in the prior art. The dynamic model makes it possible for the controller to calculate how much torque the joint motors shall provide to each of the motor axels to make the robot arm perform a desired movement and/or be arranged in a static posture. The dynamic model of the robot arm can be stored in the memory 445.

As described in connection with FIG. 2 the robot joints comprise an output encoder providing output encoder signals 436i, 436i+1 . . . 436n indicating the angular position $q_{,i}$, $q_{,i+1}$ . . . $q_{,n}$ of the output axle in relation to the respective robot joint; an input encoder providing an input encoder signal 438i, 438i+1 . . . 438n indicating the angular position of the motor axle $\Theta_{,i}$, $\Theta_{,i+1}$ . . . $\Theta_{,n}$ in relation to the respective robot joint and a motor torque sensors providing an motor torque signal 442i, 442i+1 . . . 442n indicating the torque $\tau_{motor,i}$, $\tau_{motor,i+1}$ . . . $\tau_{motor,n}$, provided by the motor axle of the respective robot joint; alternatively the motor torque signals may be provided as the current $i_{control,i}$, $i_{control,i+1}$, and $i_{control,n}$ that is provided to each joint. The controller is configured to receive the output encoder signal $436i$, $436i+1 \ldots 436n$, the input encoder signal $438i$, $438i+1 \ldots 438n$ and the motor torque signals $442i$, $442i+1 \ldots 442n$.

Figure 5:
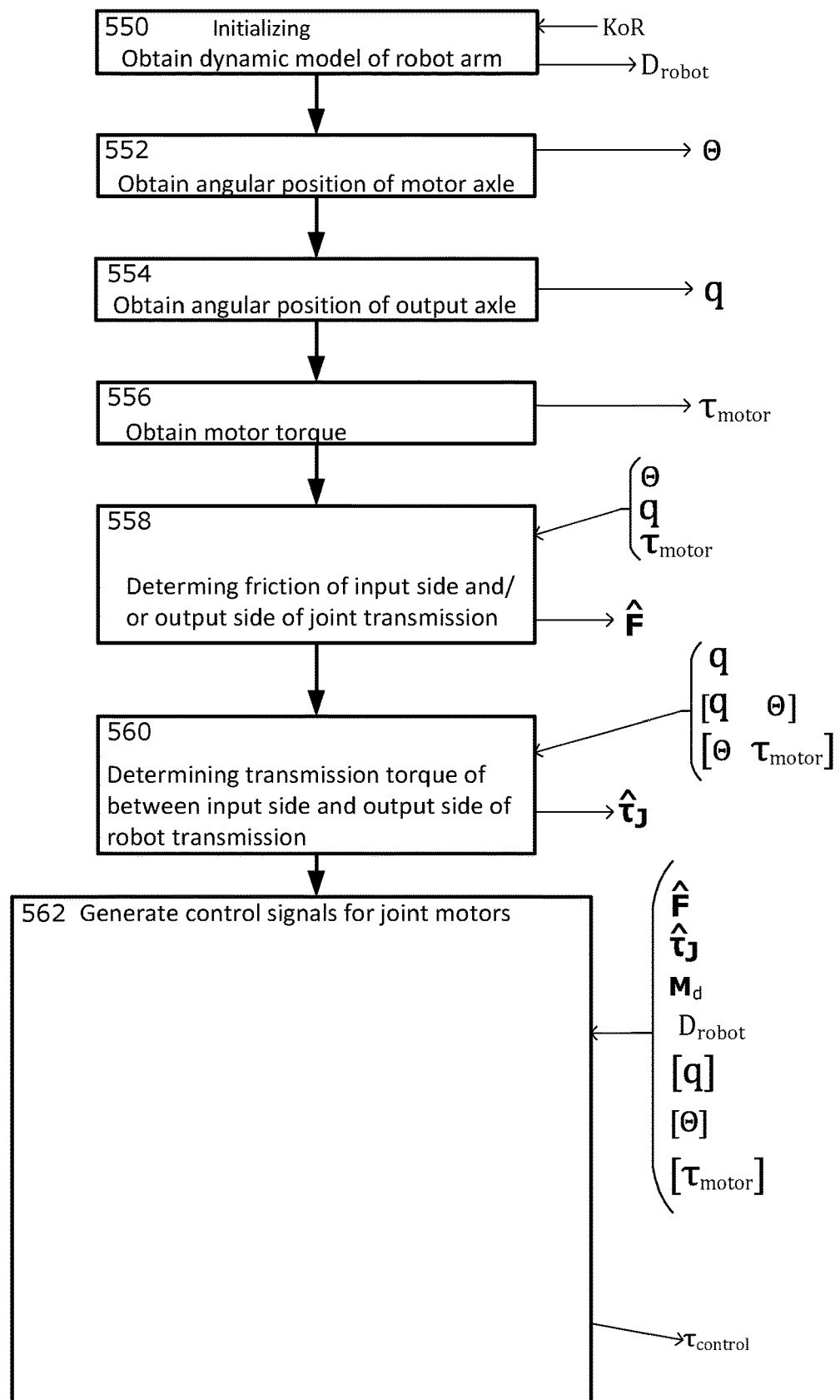
FIG. 5 illustrates a flow chart of a method of controlling a robot arm according to the present invention where the robot arm is controlled based on adaptive friction of a rotational robot joint.
Figure 6:
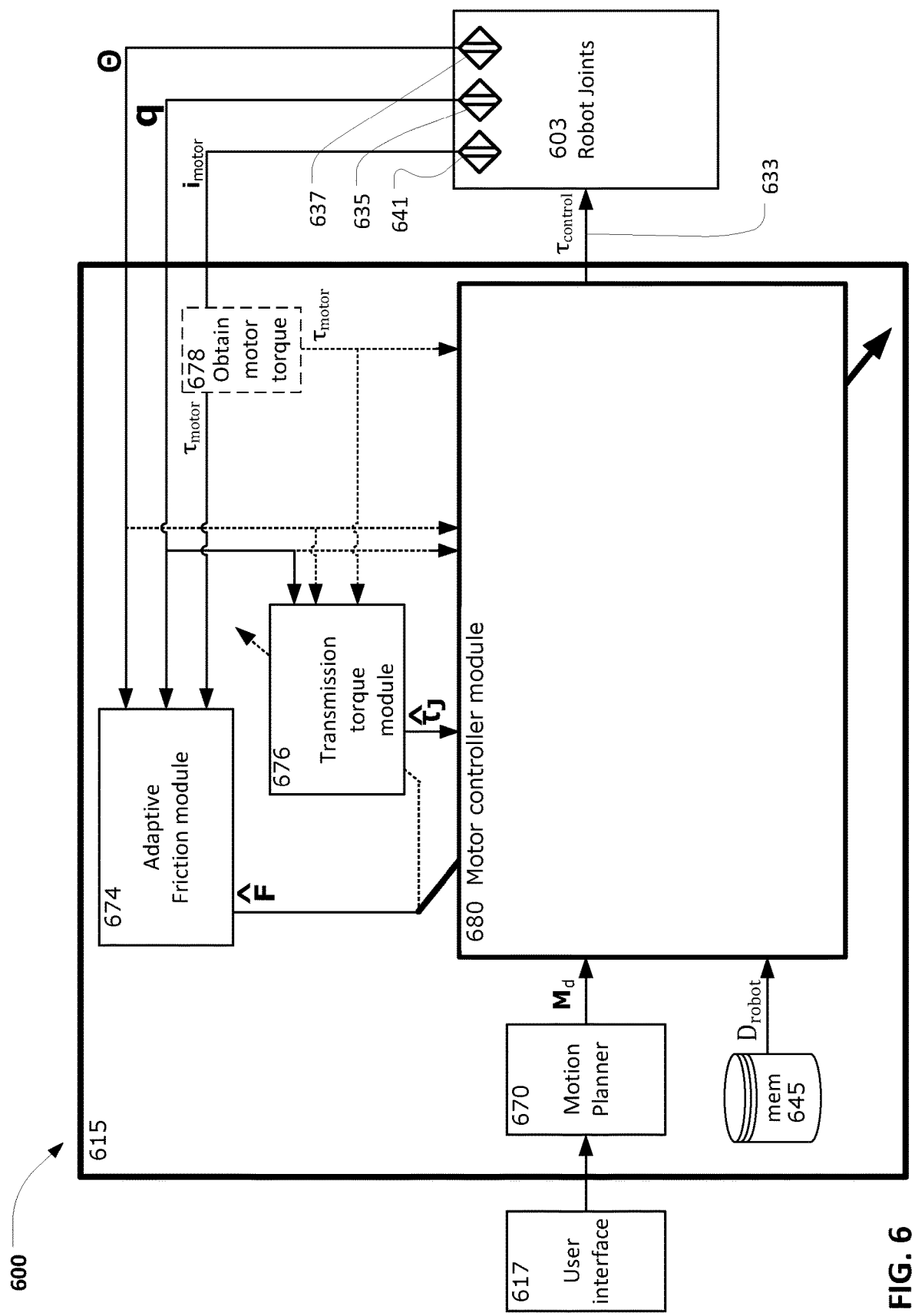
FIG. 6 illustrates a structural diagram of a robot controller system controlling a robot arm where the robot arm is controlled based on adaptive friction of a rotational robot joint.
Figure 7:
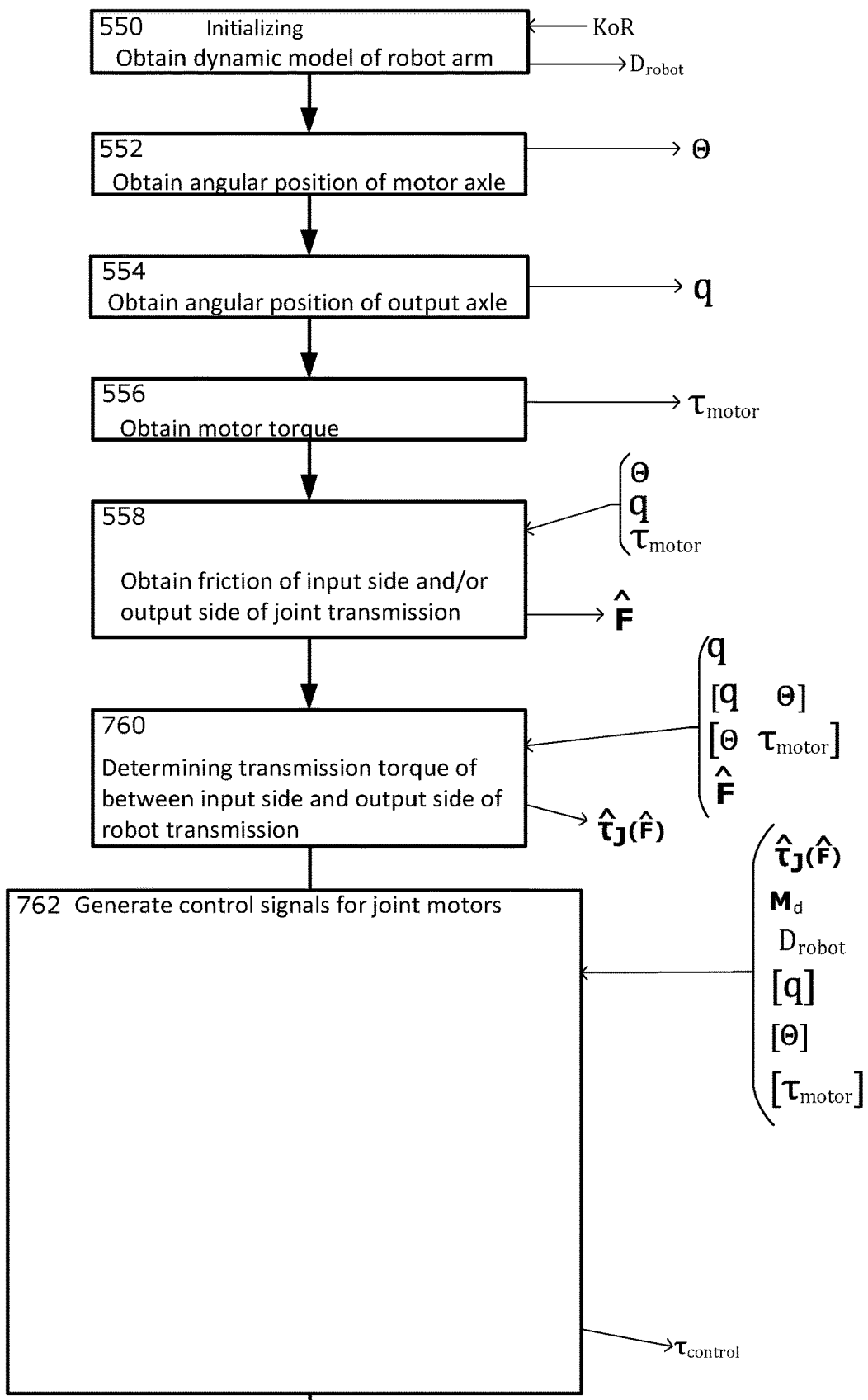
FIG. 7 illustrates a flow chart of a method of controlling a robot arm according to the present invention, where the robot arm is controlled based on an adaptive friction depending transmission torque of a rotational robot joint.
Figure 8:
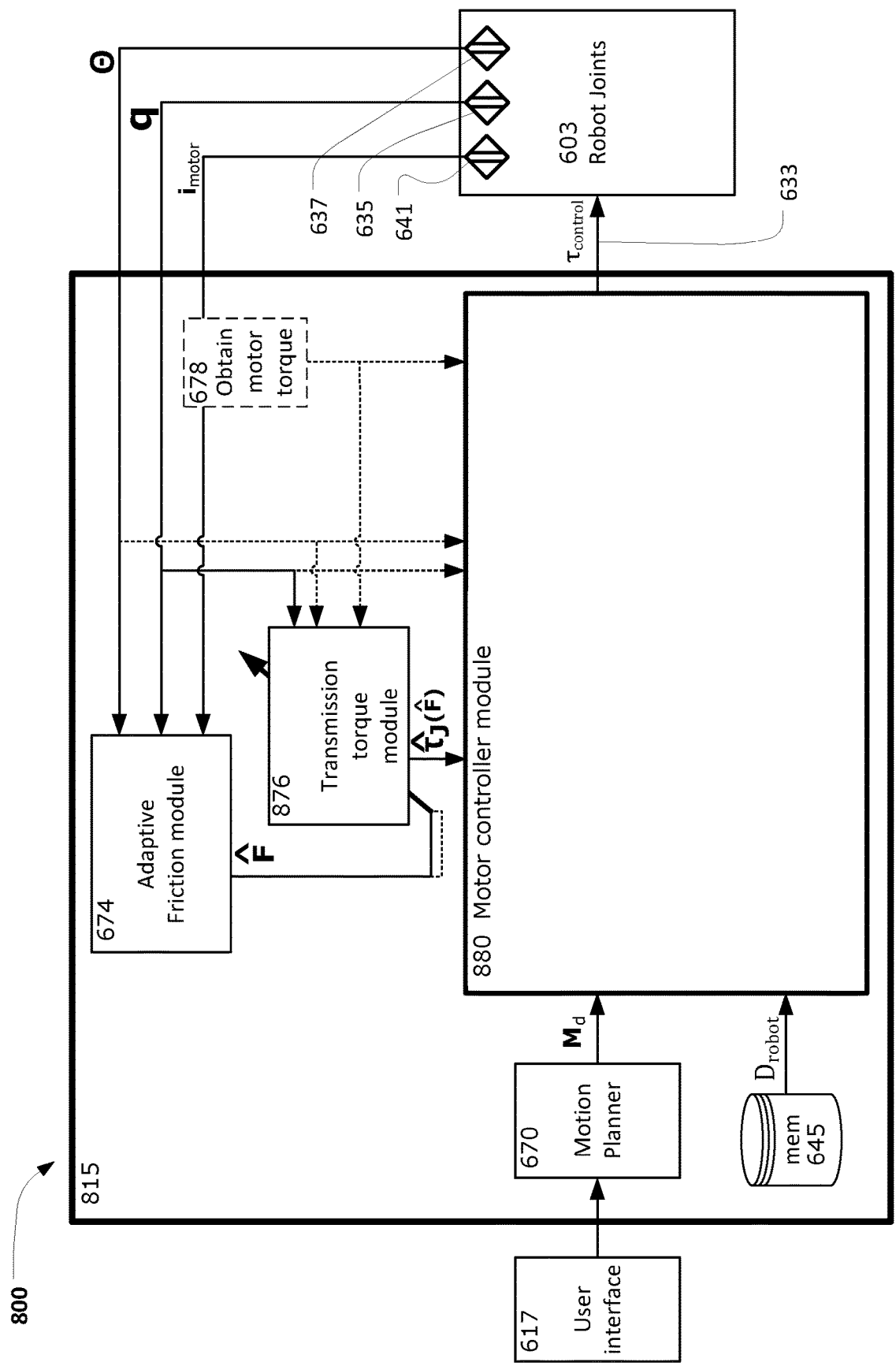
FIG. 8 illustrates a structural diagram of a robot controller system controlling a robot arm where the robot arm is controlled based on an adaptive friction depending transmission torque of a rotational robot joint.
Figure 9:
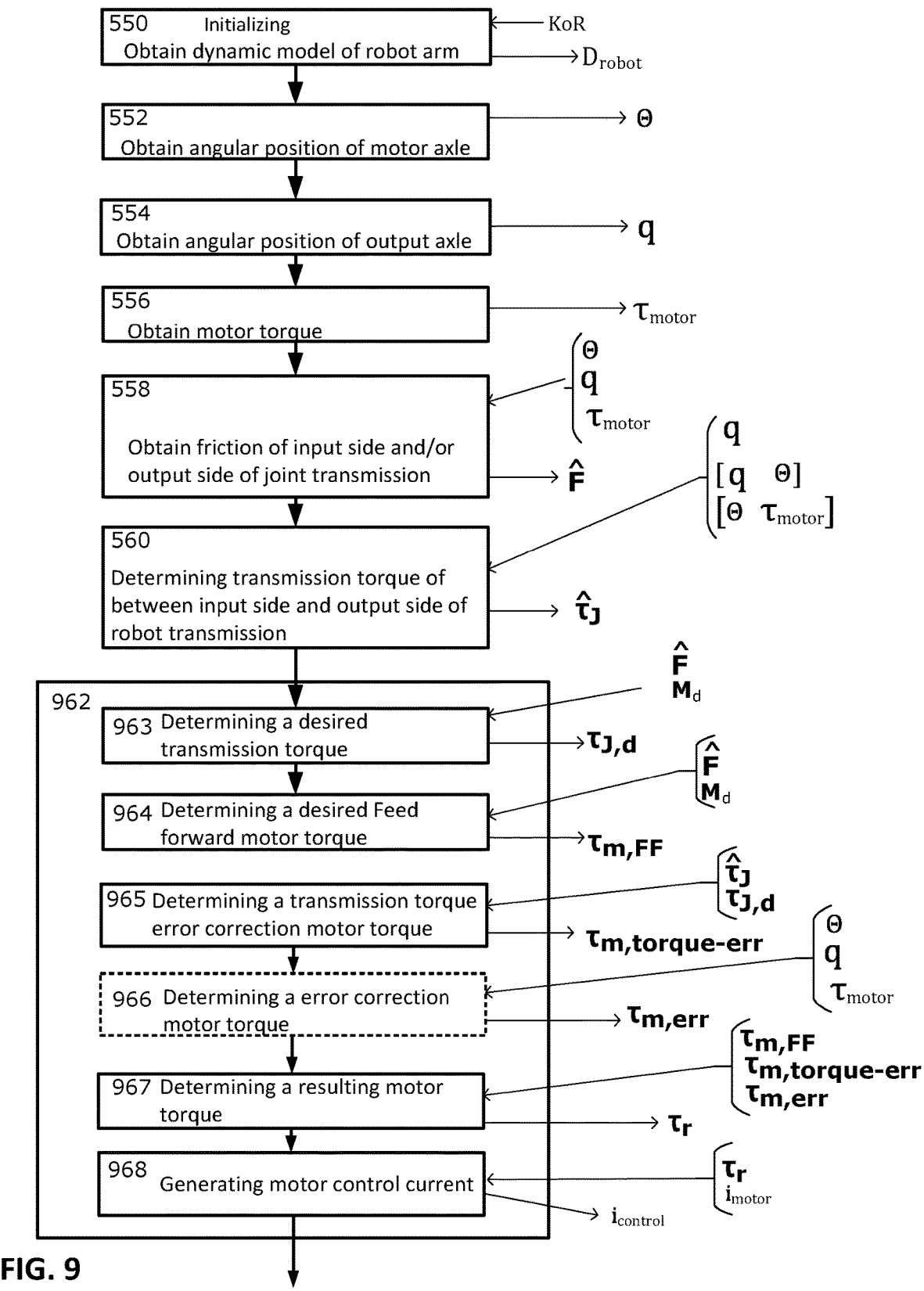
FIG. 9 illustrates a flow chart of a method of controlling a robot arm according to the present invention where the robot arm is controlled based on adaptive friction dependent feed-forward control.
Figure 10:
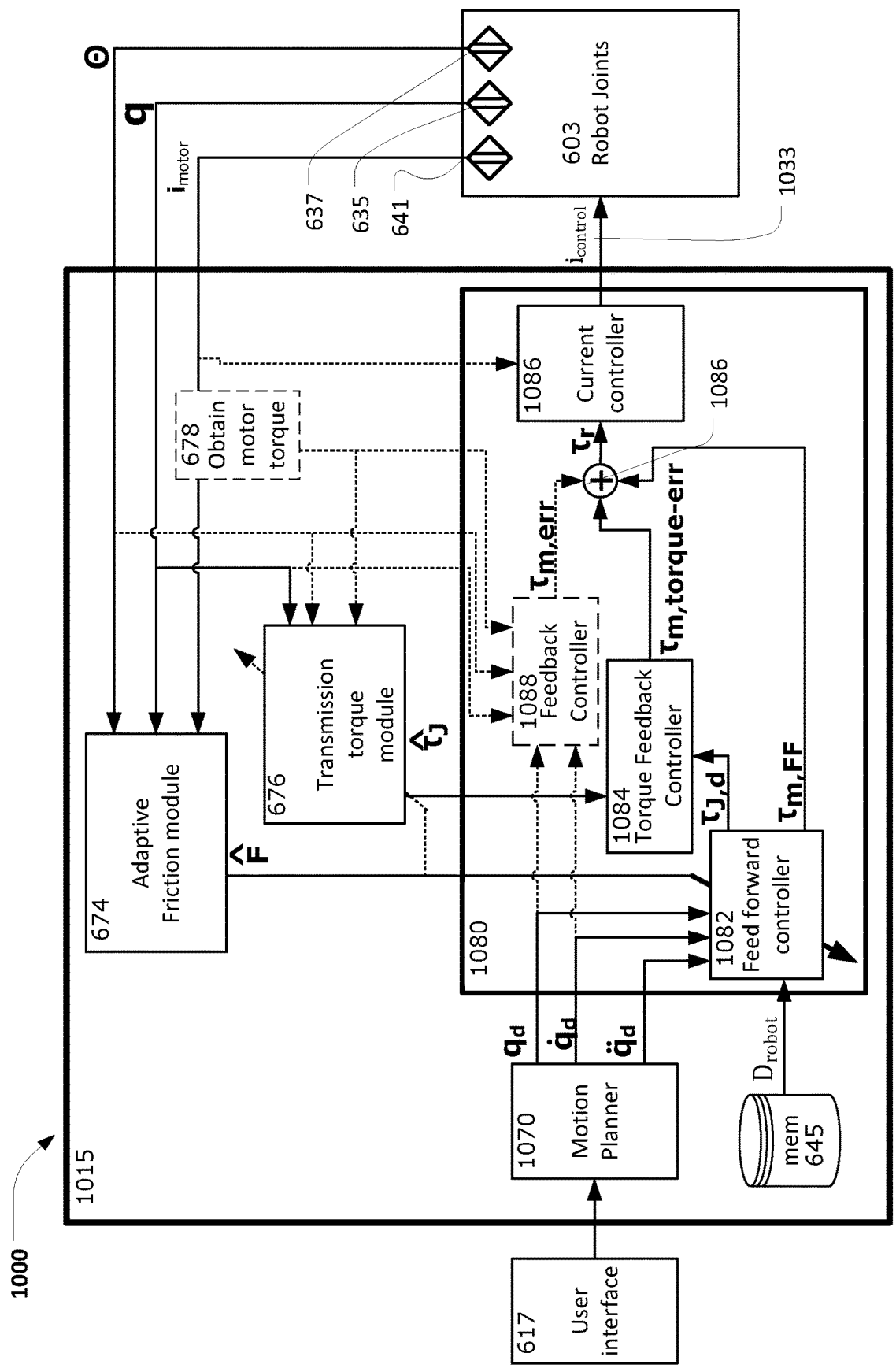
FIG. 10 illustrates a structural diagram of a robot controller system controlling robot arm where the robot arm is controlled based on adaptive friction dependent feed-forward controller.

The controller can for instance be configured to carry out the method of controlling the robot arm as illustrated in FIGS. 5, 7 and 9 and be structured as illustrated in FIGS. 6, 8 and 10 as described forwardly.

FIG. 5 illustrates a flow diagram of a method of controlling a robot arm comprising a plurality of robot joints connecting a robot base and a robot tool flange, where at least one of the robot joints is a rotational robot joint comprising a joint motor having a motor axle, where the motor axle is configured to rotate an output axle of the rotational robot joint via a robot joint transmission. The method comprises a step of initializing 550, a step 552 of obtaining the angular position of the motor axles of the joint motors; a step 554 of obtaining the angular position of the output axle of the robot joint and a step 556 of obtaining the motor torque provided by the robot motors, a step 558 of obtaining the friction torque of the robot joint transmission, step 560 of obtaining the transmission torque between the input side and output side of the robot joint transmission and a step 562 of generating control signals for the joint motors.

Step of initializing 550 comprises a step of obtaining the dynamic model $D_{robot}$ of the robot arm and can be based on prior knowledge of the robot arm and robot joints, KoR [Knowledge of Robot], such as the dimensions and weight of robot joints and robot links; joint motor properties; information relating to an eventual payload attached to the robot arm, orientation of the robot arm in relation to gravity and frictional properties of the robot arm and robot joints. The dynamic model of the robot arm can be defined and pre-stored in the memory of the controller and the user can in some embodiment be allowed to modify the dynamic model of the robot arm, for instance by providing payload information of a payload attached to the robot arm or defining the orientation of the robot arm in relation to gravity. The dynamic model of the robot arm can be obtained by considering the robot arm as an open kinematic chain having a plurality of (n+1) rigid robot links and a plurality of n revolute robot joints, comprising a joint motor configured to rotate at least one robot link.

For instance, the dynamic model as seen from the output side of the robot joint transmissions of the robot arm can be characterized by {14}:

$$\tau_{joint}=M(q)\ddot{q}+C(q,\dot{q})q+g(q)+F_q+\tau_{ext} \quad \text{eq. 10}$$

where $\tau_{joint}$ is a vector comprising the transmission torques $\tau_{joint,i} \ldots \tau_{joint,n}$ of each of the robot joint transmissions; q is a vector comprising the angular position of the output axles of the robot joint transmissions; $\dot{q}$ is a vector comprising the first time derivative of the angular position of the output axles of the robot joint transmissions and thus relates to the angular velocity of the output axles; $\ddot{q}$ is a vector comprising the second time derivative of the angular position of the output axles of the robot joint transmissions and thus relates to the angular acceleration of the output axles. M(q) is the inertia matrix of the robot arm and indicates the mass moments of inertia of the robot arm as a function of the angular position of the output axles of the robot joint transmissions. $C(q,\dot{q})\dot{q}$ is the Coriolis and centripetal torques of the robot arm as a function of the angular position and angular velocity of the output axle of the robot joint transmissions. g(q) is the gravity torques acting on the robot arm as a function of the angular position of the output axles of the robot joint transmissions.

$F_q$ is a vector comprising the friction torques acting on the output axles of the robot joint transmissions. The $F_q$ can be obtained during calibration of the robot joints for instance as described in the paragraph above containing equation 8. $\tau_{ext}$ is a vector indicating the external torques acting on the output axles of the robot joint transmissions. The external torques can for instance be provided by external forces and/or torques acting on parts of the robot arm. For instance, if the tool flange of the robot is subject to external forces and/or torques described by $F_{ext}$, the resulting torques at the output axles of the robot joints becomes:

$$\tau_{ext}=J^T(q)F_{ext} \quad \text{eq. 11}$$

where $J^T(q)$ is the transposed manipulator Jacobian of the robot arm and where $F_{ext}$ is a vector describing the direction and magnitude of the external forces and torques in relation to the tool flange of the robot arm.

Secondly, the dynamic model as seen from the input side of the robot joint transmissions becomes {14}:

$$\tau_{motor}=B\ddot{\Theta}+F_\Theta+\tau_{joint} \quad \text{eq. 12}$$

where $\tau_{joint}$ is a vector comprising transmission torque $\tau_{joint,i} \ldots \tau_{joint,n}$ of each of the robot joint transmissions; $\ddot{\Theta}$ is a vector comprising the second time derivative of the angular position of the motor axle of the joint motor and thus relates to the angular acceleration of the motor axle. B is the positive-definite diagonal matrix indicating the mass moments of inertia of the joint motors' rotors. $F_\Theta$ is a vector comprising the friction torques acting on the motor axles and $\tau_{motor}$ is a vector indicating the torque generated by the joint motors. $F_\Theta$ can be obtained for each robot joint as described in the paragraph above containing equation 9.

Step 552 of obtaining the angular position of the motor axles of the joint motors can be obtained by measuring the angular position of the motor axle for instance by using an encoder such as optical/magnetic encoders as known in the art of robotics. The angular position of the motor axles $\Theta$ can be stored in a memory for later usage for instance in order to store a number of angular positions of the motor axles obtained at different times.

Step 554 of obtaining the angular position of the output axle of the robot joint transmission can be obtained by measuring the angular position of the output axle for instance by using encoders such as optical/magnetic encoders as known in the art of robotics. The angular position of the output axles q can be stored in a memory for later usage, for instance a number of angular positions of the output axles obtained at different times can be stored in a memory. Alternatively, the angular position of the output axles of the robot joint transmissions can be obtained as the desired angular position of the output axles upon which the controller is generating the motor torques. This makes it possible to estimate the angle of the output axles in robot joints that does not comprise encoders for measuring the angular position of the output axles or the One could also estimate the output axle angular position based on the motor axle angular position for instance by estimating the output axle based on the gear ratio of the robot joint transmission.

The step 556 of obtaining the actual motor torque $\tau_{motor}$ provided by the joint motors can for instance be obtained by obtaining the current $i_{motor}$ through the joint motors whereby the actual motor torque can be obtained as known in the art of motor control. For instance, if the joint motors are provided as three-phase Permanent Mdgnet Synchronous Mdchines (PMSM) with dynamics much faster than that of the manipulator and if the joint motors are operated under their current saturation limit, the motor axle torque can be obtained by:

$$\tau_{motor} = K_\tau i_{motor} \qquad \text{eq. 13}$$

where $\tau_{motor}$ is a vector comprising, the actual torque provided by the motor axles of the joint motors (seen in the output space of the robot joint gear), $K_\tau$ is the positive-definite diagonal matrix of torque constants and $i_{motor}$ is a vector comprising the torque-generating (quadrature) current obtained from the phase currents of the joint motors using the Park Transformation.

The actual motor torque can also be obtained by using force/torque sensors such as strain gauges indicating the actual torque of the motor axle, as in many cases it can be assumed the motor torque is transferred to the motor axle.

Step 558 of obtaining the friction torque F of the input side and/or the output side of the robot joint transmission can be obtained based on at least two of:
- the angular position $\Theta$ of the motor axle;
- the angular position q of the output axle;
- the motor torque $\tau_{motor}/i_{motor}$ provided to the motor axle by the joint motor;

by using any method or a combination of methods within the field of Digital Signal Processing (DSP) or an adaptive observer method known in the art of adaptive state estimation in the field of control theory. This makes it possible to provide an online estimation of the friction torque of the robot joint transmission whereby it becomes possible to take varying friction of the robot joint transmission due to wear and changes in ambient working conditions into account when providing a control system for the robot arm. Consequently, a more accurate control of a robot arm can be provided. Further in many robots arms the angular position of the motor axle, the angular position of the output axle and the motor torque are already obtainable by various sensors and thus no additional sensors need to be provided in such robots. The adaptive filtering methods include for instance;
Least Mean Squares (LMS) filter; and
Recursive Least Squares (RLS) filter;
And the observer methods include for instance;
Luenberger Observer (LO);
Kalman Filter (KF), including also Extended Kalman Filter (EKF) and Uncented Kalman Filter (UKF);
Sliding Mode Observer (SMO), including also the Super-Twisting Sliding-Mode Observer (STSMO);
High-Gain Observer (HGO);
Fuzzy Observer (FO);
Artificial Neural Network (ANN);
where at least two of the angular position $\Theta$ of the motor axle; the angular position q of the output axle; and the motor torque $\tau_{motor}/i_{motor}$ provided to the motor axle by the joint motor serves as inputs of the observers.

For instance, adaptive friction torque estimation can be conducted to obtain an estimate of the input-side and/or output-side friction torque(s) of the robot transmissions based on the position of the motor axles of the robot joints, and/or the position of the output axles of the robot joints, and the motor torques, for instance by describing the friction torque by the linearly parametrizable model $$\hat{F} = \hat{F}_C \operatorname{sgn}(\omega) + \hat{F}_V \omega = [\operatorname{sgn}(\omega) \quad \omega] \cdot \begin{bmatrix} \hat{F}_C \\ \hat{F}_V \end{bmatrix} \qquad \text{eq. 14}$$

where $\omega$ is the angular velocity of the motor axle and/or output axle, $\hat{F}_C$ is the vector of estimated Coulomb friction coefficients, and $\hat{F}_V$ is the vector of estimated viscous friction coefficients. Due to the linear parametrization it is possible to estimate the unknown and assumed slowly changing coefficients by Recursive Least Squares (RLS) methods with some forgetting scheme discounting past data.

Assuming that data for each robot joint is sampled at times $t_k = k\, T_S$, where $T_S$ is the sampling time and k an incrementing integer denoting the specific sample, and that the dynamic friction residual $F_i(k) = \tau_{motor,i}(k) - B_i \ddot{\theta}_i(k) - \tau_{j,i}(\phi_i(k), \dot{\phi}_i(k))$, the RLS method works by estimating the unknown filter coefficients $\hat{\alpha} = [\hat{F}_{C,i}\ \hat{F}_{V,i}]^T$ through the following procedure for each sample as $$\Psi(k) = [\operatorname{sgn}(\omega_i(k))\ \omega_i(k)] \qquad \text{eq. 15}$$

$$P(k) = \frac{1}{\lambda}\left(P(k-1) - \frac{P(k-1)\Psi(k)\Psi^T(k)P(k-1)}{\lambda + \Psi^T(k)P(k-1)\Psi(k)}\right) \qquad \text{eq. 16}$$

$$Q(k) = \frac{P(k)}{\lambda + \Psi^T(k)P(k)\Psi(k)} \qquad \text{eq. 17}$$

$$L(k) = Q(k)\Psi(k) \qquad \text{eq. 18}$$

$$\hat{F}(k) = \Psi^T(k)\hat{\alpha}(k-1) \qquad \text{eq. 19}$$

$$\hat{\alpha}(k) = \alpha(k-1) + L(k)(F(k) - \hat{F}(k)) \qquad \text{eq. 20}$$

where $\lambda$ is the forgetting factor. A forgetting factor of $\lambda=1$ is chosen to estimate time-invariant (constant) parameters, and a forgetting factor $\lambda<1$ is chosen to estimate time-varying parameters. A smaller forgetting factor will make the RLS method forget parameters faster.

Figure 11:
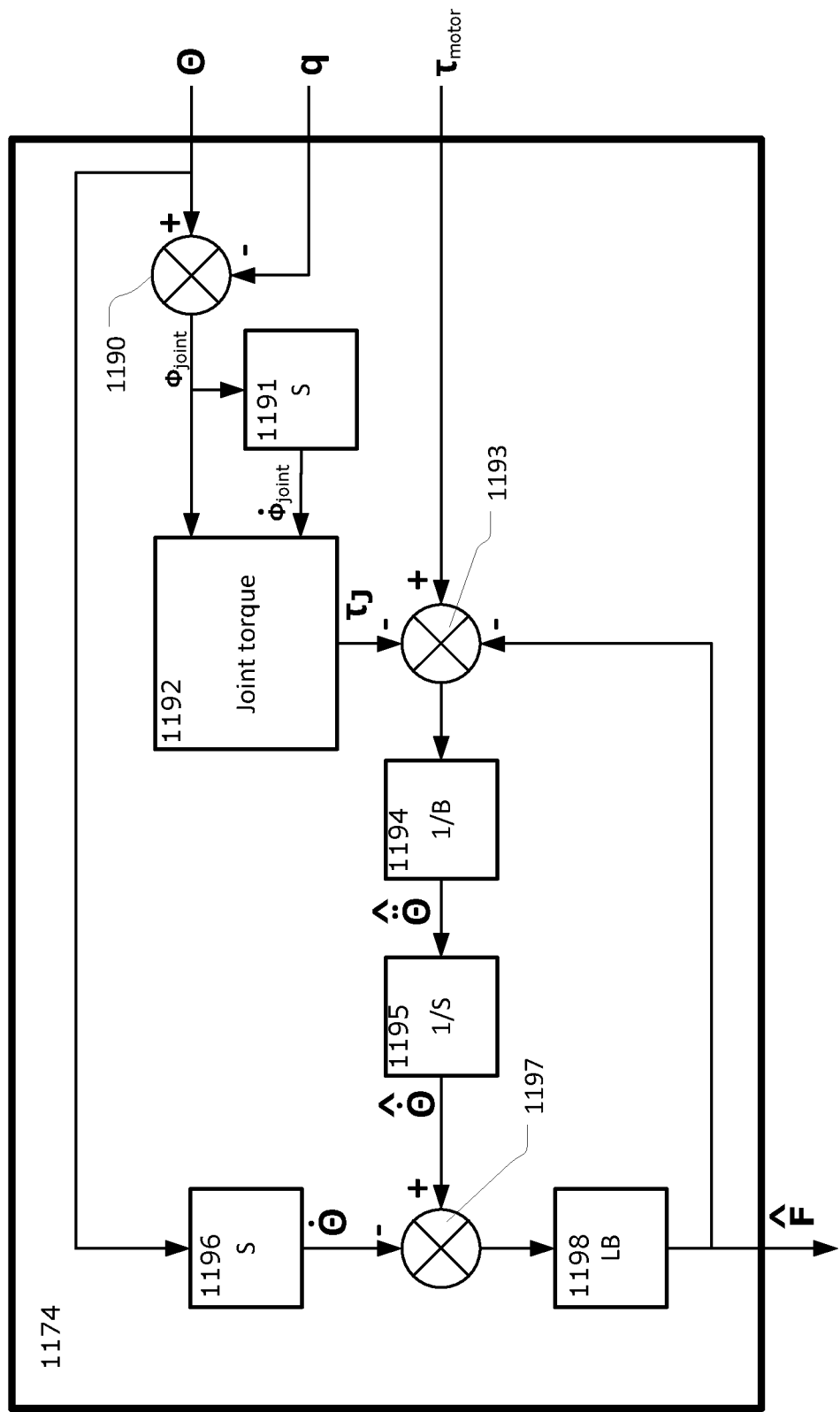
FIG. 11 illustrates a structural diagram of an adaptive friction module of a robot controller system controlling a robot arm where the adaptive friction module provides the friction of the robot joint transmission.

Estimating for instance the input-side friction torque through the use of an observer can be obtained using for instance the observer structure shown in FIG. 11 illustrating an adaptive friction module 1174, which can be implemented as the adaptive friction module 674 of the robot system illustrated in FIGS. 6, 8 and 10. Here, the difference between a model-based estimate of the angular velocity $\hat{\dot{\theta}}$ of the motor axle and the measured velocity $\dot{\theta}$ obtained by time-differentiation of the motor axle angular position $\theta$ signal is used to estimate the friction torque. The observer gain L is used to tune the observer. Based on the angular position of the motor axle $\theta$ and the angular position of the output axle q, the joint transmission deformation $\phi_{joint}$ is determined by a joint transmission deformation module 1190 based on eq. 3. The time-derivative of the joint transmission deformation $\dot{\phi}_{joint}$ is obtained by a joint transmission deformation differentiating module 1191 by differentiating the joint transmission deformation $\phi_{joint}$. Based on the joint transmission deformation and the time-derivative of the joint transmission deformation, the joint torque $\tau_j$ is obtained by a joint torque obtaining module 1192 based on eq. 4. The dynamic model as seen from the input side of the robot joint transmissions (eq. 12) is used by a motor axle inertia torque estimation module 1193 to obtain the torque From the angular acceleration of the motor axle. An estimate of the angular acceleration of the motor axle $\hat{\ddot{\theta}}$ obtained by a motor axle angular acceleration estimation module 1194 by dividing the torque obtained from 1193 with the rotor inertia B. An estimate of the motor axle angular velocity $\hat{\dot{\theta}}$ is obtained by a motor axle angular velocity estimation module 1195 based on the estimate of the angular acceleration of the motor axle. Based on the angular position $\theta$ of the motor axle, the angular velocity of the motor axle $\dot{\theta}$ is obtained by a motor axle position differentiating module 1196. The difference between the estimated angular velocity $\hat{\dot{\theta}}$ of the motor axle and the angular velocity of the motor axle $\dot{\theta}$ is obtained by a motor axle angular velocity difference module 1197 and multiplied by the observer gain L and the rotor inertia B in the inertia module 1198 to generate the input-side friction torque estimate $\hat{F}_\Theta$. The estimated input-side friction torque is also fed back to 1193.

In another embodiment the adaptive friction module 674 can also be configured to provide an estimate of the input-side and/or output-side friction torque(s) of the robot transmissions based on the position of the motor axles of the robot joints, and/or the position of the output axles of the robot joints, and the motor torques. The adaptive friction module can for instance be obtained by describing the friction torque by the linearly parametrizable model $$\hat{F} = \hat{F}_C \operatorname{sgn}(\omega) + \hat{F}_V \omega = [\operatorname{sgn}(\omega) \ \omega] \cdot \begin{bmatrix} \hat{F}_C \\ \hat{F}_V \end{bmatrix} \quad \text{eq. 21}$$

where $\omega$ is the angular velocity of the motor axle and/or the output axle, $\hat{F}_C$ is the vector of estimated Coulomb friction coefficients, and $F_V$ is the vector of estimated viscous friction coefficients. Due to the linear parametrization it is possible to estimate the unknown and assumed slowly changing coefficients by Recursive Least Squares (RLS) procedures as known in the art of adaptive control.

Step 560 of obtaining the transmission torque $\hat{\tau}_j$ between the input side and the output side of the joint transmissions can be obtained based on at least one of:
- the angular position (q) of the output axle;
- the angular position (q) of the output axle and the angular position ($\Theta$) of the motor axle;
- the angular position ($\Theta$) of the motor axle and the motor torque ($\tau_{motor}$) provided to the motor axle by the joint motor;

for instance, based on the angular position (q) of the output axle using eq. 10, where $F_q$ have been obtained for each robot joint as described in the paragraph above using equation eq. 8; or by using eq. 4, where the joint transmission deformation $\phi_{joint}$ and its time-derivative have been obtained based on the angular position ($\Theta$) of the motor axle and the angular position (q) of the output axle using equation eq. 3. Alternatively, the transmission torque can be obtained based on the angular position ($\Theta$) of the motor axle and the motor torque ($\tau_{motor}$) provided to the motor axle by the joint motor using eq. 12, where $F_\Theta$ have been obtained for each robot joint as described in the paragraph above containing equation 9. It is noted that in one embodiment the $F_q$ and/or $F_\Theta$ can be obtained based on the friction torque $\hat{F}$ of the input side and/or the output obtained in step 558. Further it is to be understood the transmission torque $\hat{\tau}_j$ can be obtained based on two or more of the data sets described above and where the transmission torque is obtained as any combination of the transmission torques obtained using the different methods.

Step 562 of generating motor control signal indicative of a desired motor torque $\tau_{control}$ for at least one of the joint motors is based on at least:
- the friction torque F of the input side of the robot joint transmission and/or the output side of the robot joint transmission;
- the robot joint transmission torque $\tau_j$ between the input side and the output side of the robot joint transmission;

where the friction torque F have been obtained as described in step 558 and where the robot joint transmission torque has been obtained as described in step 560. In addition to the friction torque F and the joint transmission torque $\tau_j$, the desired motor torque is also obtained based on a desired motion $M_d$ of at least a part of the robot arm, and a dynamic model of the robot arm $D_{robot}$. For instance, the desired motor torque can be obtained using dynamic model of the robot arm as expressed by eq. 12 where the second time derivative of the angular position of the motor axle $\ddot{\Theta}$ has been obtained based on the angular position $\Theta$ of the motor axle obtained in step 552, the friction torques $F_\Theta$ acting on the motor axles have been obtained in step 558 and the transmission torque $\tau_j$ have been obtained in step 560 based on eq. 10, and based on desired motion of the robot arm. In eq. 10 the desired motion parameter is provided as desired angular positions $q_d$, desired angular velocities $\dot{q}_d$, and desired angular accelerations $\ddot{q}_d$ of the output axles of the robot joint transmissions. The friction torques $F\Theta$ are adaptively obtained in step 558 and consequently the motor control signals indicating the desired motor torques are generated based on adaptive friction of the robot joint transmissions whereby a more accurate control of the robot joints can be provided.

FIG. 6 illustrates a structural diagram of a robot system 600 comprising a user interface 617, a robot control system 615 controlling a robot arm (not illustrated) by controlling the robot joints 603. The robot arm is like the robot arm illustrated in FIGS. 1-4 and comprises at least one rotational robot joint like the robot joint illustrated in FIG. 2. The rotational robot joint comprises an input encoder 637 indicating the angular position of the motor axle $\Theta$, and output encoder 635 indicating the angular position q of the output axle and a motor torque sensor 641 indicating the motor torque provided by the joint motor. In the illustrated embodiment the motor torque is provided as a current sensor indicating the motor current $i_{motor}$ of the joint motor. The robot control 615 system is configured to control the robot joints based on the method of controlling a of the robot arm obtained according to the present invention. The user interface enables 617 a user to communicate with the robot controller system for instance in order to program the robot arm to perform various tasks. The user interface may be provided as described in connection with FIG. 1.

The robot controller system 615 comprises a motion planner module 670, an adaptive friction module 674, a transmission torque module 676, a motor controller module 680 and optional a motor torque obtaining module 678.

The motion planner module 670 is configured to provide the desired motions of the robot arm, for instance by generating trajectories of parts of the robot arm. The trajectories can for instance be generated based on a robot program instructing the robot arm to perform various tasks. In the illustrated embodiment the motion planner module provides a desired motion $M_d$ of parts of the robot arm. The desired motion of parts of the robot arm can for instance be indicated as motions properties of the robot joints, such as angular position $q_d$ of output axles of the joint transmissions, a desired angular velocity $\dot{q}_d$ of output axles of the joint transmissions, a desired angular acceleration $\ddot{q}_d$ of the robot transmission. It is noted that the desired motion of parts of the robot arm also can be indicated as a position of various parts of the robot arm in relation to a reference point, for instance the desired motion may be indicated as a position, velocity and/or acceleration of the robot tool flange in relation to the robot base.

The desired motion $M_d$ is provided to the motor controller module 680. The motor controller module 680 is configured to generate at least one motor control signal 633 to the joint motors, for instance in form of a signal indicating the motor torque $\tau_{control}$ that each joint motor shall provide to the motor axles or a current signal indicating the current $i_{control}$, that each joint motor shall provide. The motor controller module 680 is configured to generate the motor control signal 633 based on:
- the desired motion $M_d$;
- a dynamic model of the robot arm $D_{robot}$;
- the friction torque $\hat{F}$ of at the input side of the robot joint transmission and/or the output side of the robot joint transmission;
- the robot joint transmission torque $\tau_j$ between the input side and the output side of the robot joint transmission;

where the friction torque $\hat{F}$ is obtained by the adaptive friction module 674, the robot joint transmission torque $\tau_j$ is obtained by transmission torque module 676 and the dynamic model of the robot arm $D_{robot}$ is stored in a memory 645. The motor controller module can for instance be configured to generate the motor control signal 633 by carrying out step 562 of the method described in FIG. 5. As indicated by dotted lines the motor controller module may additionally also be configured to generate the motor control signal 633 based on:
- the angular position q of the output axle;
- the angular position Θ of the motor axle;
- the motor torque $\tau_{motor}$ provided to the motor axle by the joint motor.

The optional motor torque obtaining module 678 is configured to obtain the motor torque provided by the joint motors based on the current $i_{motor}$ as known in the art and to provide the motor torque $\tau_{motor}$ to the adaptive friction module 674 and optionally to the transmission torque module and the motor controller module 680. However, it is noted that the motor torque obtaining module 678 also can be provided as a part of the adaptive friction module 674, the transmission torque module and/or the motor controller module whereby the current $i_{motor}$ is provided directly to the various modules. Further the motor torque obtaining module may also be provided as an external module to the robot controller system 615.

The adaptive friction module 674 is configured to provide the friction torque $\hat{F}$ at the input side of the robot joint transmission and/or the output side of the robot joint transmission based on at least two of:
- the angular position Θ of the motor axle;
- the angular position q of the output axle;
- the motor torque $\tau_{motor}/i_{motor}$ provided to the motor axle by the joint motor;

and is configured to carry out step 558 of the method described in FIG. 5. The friction torque $\hat{F}$ is provided to the motor controller module as an adaptive parameter, further additionally the friction torque $\hat{F}$ may also be provided to the transmission torque module as an adaptive parameter.

The transmission torque module 676 is configured to provide the transmission torque $\hat{\tau}_j$ between input side and the output side of the joint transmissions and can be obtained based on at least one of:
- the angular position q of the output axle (illustrated in solid line);
- the angular position q of the output axle (illustrated in dotted line) and
- the angular position Θ of the motor axle;
- the angular position (Θ) of the motor axle and the motor torque (illustrated in dotted line) provided to the motor axle by the joint motor.

The transmission torque module is configured to carry out step 560 of the method described in FIG. 5. The transmission torque is then provided to the motor controller module.

The robot system 600 illustrated in FIG. 6 makes it possible to provide a robot arm where the friction torque of the robot joint transmissions is dynamically adapted whereby a more accurately control of the robot arm can be provided.

FIG. 7 illustrates a flow diagram of another method of controlling a robot arm comprising a plurality of robot joints connecting a robot base and a robot tool flange, where at least one of the robot joints is a rotational robot joint comprising a joint motor having a motor axle, where the motor axle is configured to rotate an output axle of the rotational robot joint via a robot joint transmission. The method is like the method illustrated and described in FIG. 5 and similar steps and features have been given the same reference numbers as in FIG. 5 and will not be described further.

In this embodiment step 760 of obtaining the transmission torque $\hat{\tau}_j$ between the input side and output side of the robot joint transmission is further obtained based on the friction torque $\hat{F}$. Consequently, the transmission torque is obtained based on the adaptive friction torque whereby the transmission torque $\hat{\tau}_j(\hat{F})$ can be obtained and adapted according to the adaptive friction torque. For instance, the transmission torque $\hat{\tau}_j(\hat{F})$ can be obtained by using eq. 10, where $F_q$ have been obtained according to step 558. Additionally or alternatively the transmission torque $\hat{\tau}_j(\hat{F})$ can be obtained by using eq. 12, where $F_\Theta$ each robot have been obtained in step 558.

In this embodiment step 762 of generating control signals for the joint motors is based on the joint transmission torque $\hat{\tau}_j(\hat{F})$ obtained in step 760 and since the joint transmission torque $\hat{\tau}_j(\hat{F})$ in step 760 is obtained based on the friction torque $\hat{F}$ of at the input side of the robot joint transmission and/or the output side of the robot joint transmission the control signals of for the joint motor will in step 762 indirectly also be obtained based on the friction torque $\hat{F}$. In addition, as described the desired motor torque are also obtained based on a desired motion $M_d$ of at least a part of the robot arm and a dynamic model of the robot arm $D_{robot}$.

FIG. 8 illustrates a structural diagram of a robot system 800. The robot system is like the robot system illustrated and described in FIG. 6 and similar elements and features have been given the same reference numbers as in FIG. 6 and will not be described further.

In this embodiment the transmission torque module 876 is configured to provide the transmission torque $\hat{\tau}_j$ between the input side and output side of the robot joint transmission based on the friction torque $\hat{F}$. Consequently, the transmission torque is obtained based on the adaptive friction whereby the transmission torque $\hat{\tau}_j(\hat{F})$ can be obtained and adapted according to the adaptive friction. For instance, the transmission torque $\hat{\tau}_j(\hat{F})$ can be obtained by using eq. 10, where $F_q$ have been obtained as described in step 558. Additionally or alternatively the transmission torque $\hat{\tau}_j(\hat{F})$ can be obtained by using eq. 12, where $F_\Theta$ have been obtained as described in step 558.

The motor controller module 880 is configured to generate control signals for the joint motors based on the joint transmission torque $\hat{\tau}_j(\hat{F})$ provided by transmission torque module 876, where the transmission torque module 876 for instance is configured to carry out step 760 described above. Since the joint transmission torque $\hat{\tau}_j(\hat{F})$ provided by the transmission torque module 876 is obtained based on the friction torque $\hat{F}$ of the input side of the robot joint transmission and/or the output side of the robot joint transmission the control signals for the robot joint motor generated by the motor controller module 880 will indirectly also be obtained based on the friction torque $\hat{F}$. In addition, as described the desired motor torque are also obtained based on a desired motion $M_d$ of at least a part of the robot arm and a dynamic model of the robot arm $D_{robot}$.

FIG. 9 illustrates a flow diagram of another method of controlling a robot arm comprising a plurality of robot joints connecting a robot base and a robot tool flange, where at least one of the robot joints is a rotational robot joint comprising a joint motor having a motor axle, where the motor axle is configured to rotate an output axle of the rotational robot joint via a robot joint transmission. The method is like the method illustrated and described in FIG. 5 and similar steps and features have been given the same reference numbers as in FIG. 5 and will not be described further.

In this embodiment step 962 of generating motor control signals comprises:
- a step 963 of determining a desired transmission torque $\tau_{J,d}$;
- a step 964 of determining a desired feed-forward motor torque $\tau_{m,FF}$;
- a step 965 of determining a transmission torque error correction motor torque $\tau_{m,torque-err}$;
- a step 967 of determining a resulting motor torque $\tau_r$;
- an optional step 966 of determining an error correction motor torque;
- a step 968 of generating a motor control signal indicative of a motor control current.

Step 963 of determining a desired transmission torque $\tau_{J,d}$ indicative of desired transmission torque of the robot joint transmission can be based on:
- a dynamic model of the robot $D_{robot}$;
- at least one motion parameter $M_d$, $q_d$, $\dot{q}_d$, $\ddot{q}_d$ indicating a desired motion of at least a part of the robot arm; and
- the friction torque $\hat{F}$ of at least one of the input side of the robot joint transmission and the output side of the robot joint transmission.

This makes it possible to obtain a more accurate desired transmission torque $\tau_{J,d}$ as the friction term adaptively can be determined and therefore more correctly be incorporate into the dynamic model of the robot arm. For instance the desired transmission torque $\tau_{J,d}$ may be obtained by using eq. 10 and the desired transmission torque $\tau_{J,d}$ may in step 965 be used to obtain a transmission torque error correction motor torque $\tau_{m,torque-err}$.

Step 965 of determining the transmission torque error correction motor torque $\tau_{m,torque-err}$ indicating a motor torque minimizing differences between the desired transmission torque $\tau_{J,d}$ and the robot joint transmission torque $\hat{\tau}_j$ can be based on desired transmission torque $\tau_{J,d}$; and the robot joint transmission torque $\hat{\tau}_j$. This makes it possible to compare the actual transmission torque $\hat{\tau}_j$ obtained in step 560 with the desired transmission torque $\tau_{J,d}$ and provide a determine a transmission torque error correction motor torque which can correct eventual differences as known in the art of feed-back control systems.

Step 964 of determining a desired feed-forward motor torque $\tau_{m,FF}$ indicating a desired motor torque of the joint motor can be based on:

a dynamic model of the robot $D_{robot}$;
at least one motion parameter $M_d$, $q_d$, $\dot{q}_d$, $\ddot{q}_d$ indicating a desired motion of at least a part of the robot arm; and
the friction torque $(\hat{F})$ of at least one of the input side of the robot joint transmission and the output side of the robot joint transmission.

This makes it possible to obtain a more accurate desired feed-forward motor torque $\tau_{m,FF}$ as the friction term adaptively can be determined and thus be more correctly incorporated into the dynamic model of the robot. For instance the desired feed-forward motor torque $\tau_{m,FF}$ may be obtained by using eq. 10 and eq. 12 and desired feed-forward motor torque $\tau_{m,FF}$ may then be used to generate the motor control signal as known in the art of feed-forward control mechanisms.

Step 966 of determining error correction motor torque $\tau_{m,err}$ indicating a motor torque minimizing errors between at least one of:
- a desired motion parameter of the robot arm and actual motion parameter of the robot arm;
- a desired angular position $q_d$ of the output axle and the angular position $q$ of the output axle;
- a desired angular velocity $\dot{q}_d$ of the output axle and the angular velocity $\dot{q}$ of the output axle;
- a desired angular acceleration $\ddot{q}_d$ of the output axle and the angular acceleration velocity $\ddot{q}$ of the output axle;
- a desired angular position $\Theta_d$ of the motor axle and the angular position $\Theta$ of the motor axle;
- a desired angular velocity $\dot{\Theta}_d$ of the motor axle and the angular velocity $\dot{\Theta}$ of the motor axle;
- a desired angular acceleration $\ddot{\Theta}_d$ of the motor axle and the angular acceleration velocity $\ddot{\Theta}$ of the motor axle;
- a desired torque $\tau_{motor,d}$ provided to the motor axle by the joint motor and the motor torque $\tau_{motor}$) provided to the motor axle by the joint motor.

This makes it possible to compare the parameters of the robot arm with corresponding desired parameters of the robot arm and determine a correction parameters which can be used to correct eventual errors between desired parameters and actual parameters as known in the art of feed-back control systems for instance as described in {15}

Step 967 of determining a resulting motor torque $\tau_r$ indicative of the resulting motor torque to be applied by the joint motor can be based on at least one of:
the transmission torque error correction motor torque $\tau_{m,torque-err}$;
desired feed-forward motor torque $\tau_{m,FF}$; and
error correction motor torque $\tau_{m,err}$;
where the motor control signal is generated based on the resulting motor torque. This makes it possible to generate the motor control signals for the joint motors based on both feed-forward parameters and feed-back parameters where the friction of the robot joint transmissions are adapted according to the operation of the robot arm.

FIG. 10 illustrates a structural diagram of a robot system 1000. The robot system is like the robot system illustrated and described in FIG. 6 and similar elements and features have been given the same reference numbers as in FIG. 6 and will not be described further. The robot controller system 1070 comprises a motion planner module 1070, an adaptive friction module 674, a transmission torque module 676, a motor controller module 1080 and optional a motor torque obtaining module 678.

The motion planner module 1070 is configured to provide the desired motions of the robot arm, for instance by generating trajectories of parts of the robot arm. The trajectories can for instance be generated based on a robot program instructing the robot arm to perform various tasks.

In the illustrated embodiment the desired motions $M_d$ provided to the motor controller module 1080 are a desired angular position $q_d$ of the output axles of the joint transmissions, a desired angular velocity $\dot{q}_d$ of the output axles of the joint transmissions and a desired angular acceleration $\ddot{q}_d$ of output axles of the robot transmission.

The motor controller module comprises a feed-forward controller module 1082, a torque Feed-back module 1084, a motor current controller 1086 and an optional a feed-back controller module 1080.

The feed-forward controller module 1082 is configured to determine a desired transmission torque $\tau_{J,d}$ indicative of desired transmission torque of the robot joint transmission based on:
- a dynamic model of the robot $D_{robot}$;
- at least one motion parameter $M_d$, $q_d$, $\dot{q}_d$, $\ddot{q}_d$ indicating a desired motion of at least a part of the robot arm; and
- the friction torque ($\hat{F}$) of at least one of the input side of the robot joint transmission and the output side of the robot joint transmission.

The feed-forward controller module can for instance be configured to carry out step 963 of the method illustrated in FIG. 9 and similar advantages are achieved by the feed-forward controller.

The feed-forward controller module 1082 can also be configured to determine a desired feed-forward motor torque $\tau_{m,FF}$ indicating a desired motor torque of the joint motor based on:
- a dynamic model of the robot $D_{robot}$;
- at least one motion parameter $M_d$, $q_d$, $\dot{q}_d$, $\ddot{q}_d$ indicating a desired motion of at least a part of the robot arm; and
- the friction torque F of at least one of the input side of the robot joint transmission and the output side of the robot joint transmission.

The feed-forward controller module can for instance be configured to carry our step 964 of the method illustrated in FIG. 9 and similar advantages are achieved by the feed-forward controller.

The torque Feed-back controller module 1084 is configured to determine a transmission torque error correction motor torque $\tau_{m,torque-err}$ indicating a motor torque minimizing differences between the desired transmission torque $\tau_{J,d}$ and the robot joint transmission torque $(\hat{\tau}_j)$, where the transmission torque error correction motor torque $\tau_{m,torque-err}$ is determined based on:
- the desired transmission torque $\tau_{J,d}$; and
- the robot joint transmission torque $\tau_j$.

The torque Feed-back controller module 1084 can for instance be configured to carry out step 965 of the method illustrated in FIG. 9 and similar advantages are achieved by torque Feed-back controller module 1084.

The robot controller comprises a feed-back controller module 1088 configured to determine an error correction motor torque $\tau_{m,err}$ indicating a motor torque minimizing errors between at least one of:
- a desired motion parameter of the robot arm and actual motion parameter of the robot arm;
- a desired angular position $q_d$ of the output axle and the angular position q of the output axle;
- a desired angular velocity $\dot{q}_d$ of the output axle and the angular velocity $\dot{q}$ of the output axle;
- a desired angular acceleration $\ddot{q}_d$ of the output axle and the angular acceleration velocity $\ddot{q}$ of the output axle;
- a desired angular position $\Theta_d$ of the motor axle and the angular position $\Theta$ of the motor axle;
- a desired angular velocity $\dot{\Theta}_d$ of the motor axle and the angular velocity $\dot{\Theta}$ of the motor axle;
- a desired angular acceleration $\ddot{\Theta}_d$ of the motor axle and the angular acceleration velocity $\ddot{\Theta}$ of the motor axle;
- a desired torque $\tau_{motor,d}$ provided to the motor axle by the joint motor and the motor torque $\tau_{motor}$ provided to the motor axle by the joint motor.

The feed-back controller module 1088 can for instance be configured to carry out step 966 of the method illustrated in FIG. 9 and similar advantages are achieved feed-back controller module 1088.

The motor current controller module 1086 is configured to generate a motor control signal indicating a motor current $i_{control}$ for the robot joint based on a resulting motor torque $\tau_r$ indicative of a resulting motor torque to be applied by the joint motor where the resulting motor torque $\tau_r$ is determined based on at least one of:
- the transmission torque error correction motor torque $\tau_{m,torque-err}$;
- desired feed-forward motor torque $\tau_{m,FF}$; and
- error correction motor torque $\tau_{m,err}$.

The motor current controller may be provided as any motor control driver driving and controlling motors base on a desired torque. Typically, such motor control drivers generate signal indicative of the current to be provided to the motor coil. In some embodiment the motor control driver generates the currents directly. It is to be understood that an adaptive or non-adaptive system can be configured to provide smoothed estimates of the position of the motor axles and/or output axles of the robot joints based on noisy measurements.

The invention comprises an adaptive control system having an adaptive feed-forward control command and a computation of the torque through the robot joint transmission in at least one of the robot joints. The present invention can for instance be provided at a robot arm comprising a robot control system which monitors and controls the robot joint, whereby the position error is reduced when the robot is subject to changes in ambient conditions, wear, etc. This is achieved by providing control of robot joint torque based on an adaptive observer estimating the robot joint friction torque adaptively and the robot joint torque.

BRIEF DESCRIPTION OF FIGURE REFERENCES

| | |
|---|---|
| 600, 800, 1000 | Robot system |
| 101 | robot arm |
| 103a-103f, 203, 303, 403i, 403i + 1, 403n, 603 | robot joint |
| 104b, 104c, 104d, 304i; 304i − 1 | robot link |
| 105 | robot base |
| 107 | robot tool flange |
| 209, 309 | joint motor |
| 111a-111f, 211 | axis of rotation |
| 113a-113f:, 213 | rotation arrow |
| 115, 415, 615, 815, 1015 | robot controller |
| 117, 617 | interface device |
| 119 | display |
| 121 | input device |
| 123 | direction of gravity |
| 225, 325i | motor axle |
| 326 | spring connecting input side and output side |
| 227, 327i | output axle |
| 328 | damper connecting input side and output side |
| 229, 329i | robot joint transmission |
| 231 | output flange |
| 233, 433i; 433i + 1; 433n, 633 | motor control signal |
| 235, 635 | output encoder |

| | |
|---|---|
| 236, 436i; 436i + 1; 436n | output encoder signal |
| 237, 637 | input encoder |
| 238, 438i; 438i + 1; 438n | input encoder signal |
| 239 | encoder wheel |
| 241, 641 | motor torque sensor |
| 242, 442i; 442i + 1; 442n | motor torque signal |
| 443 | Processor |
| 445, 645 | memory |
| 550 | Step of initializing |
| 552 | Step of obtaining the angular position of motor axle |
| 554 | Step of obtaining the angular position of output axle |
| 556 | Step of obtaining the actual motor torque |
| 558 | Step of obtaining the friction torque of joint transmission |
| 560, 760 | Step of obtaining the transmission torque between the input side and the output side of the joint transmissions |
| 562, 762, 962 | Step of generating motor control signals indicative of a desired motor torque |
| 963 | Step of determining a desired transmission torque |
| 964 | Step of determining a desired feed-forward motor torque |
| 965 | Step of determining a transmission torque error correction motor torque |
| 966 | Step of determining an error correction motor torque |
| 967 | Step of determining resulting motor torque |
| 968 | Step of generating a motor control signal indicating desired motor current |
| 670 | motion planner |
| 674, 1174 | adaptive friction module |
| 676, 876 | transmission torque module |
| 678 | motor torque module |
| 680, 880, 1080 | motor controller module |
| 1082 | Feed-forward controller module |
| 1084 | torque feed-back controller module |
| 1086 | current controller |
| 1088 | feed-back controller module |
| 1190 | joint transmission deformation module |
| 1191 | joint transmission deformation differentiating module |
| 1192 | joint torque obtaining module |
| 1193 | motor axle inertia torque estimation module |
| 1194 | motor axle angular acceleration estimation module |
| 1195 | motor axle angular velocity estimation module |
| 1196 | motor axle position differentiating module |
| 1197 | motor axle angular velocity difference module |
| 1198 | A gain and inertia module |

The invention claimed is:

1. A method of controlling a robotic arm, where the robotic arm comprises joints connecting a base and a tool flange, where at least one of the joints is a rotational joint comprising a joint motor having a motor axle, where the motor axle is configured to rotate an output axle of the rotational joint via a joint transmission, the method comprising:
obtaining an angular position of the motor axle;
obtaining an angular position of the output axle;
obtaining a motor torque provided to the motor axle by the joint motor;
determining a friction torque of at least one of an input side of the joint transmission or and an output side of the joint transmission based on at least two of:
the angular position of the motor axle;
the angular position of the output axle; or
the motor torque provided to the motor axle by the joint motor;
determining a robot joint transmission torque between the input side and the output side of the joint transmission based on at least one of:
the angular position of the output axle;
the angular position of the output axle and the angular position of the motor axle; or
the angular position of the motor axle and the motor torque provided to the motor axle by the joint motor;
generating a motor control signal for the joint motor of the rotational joint based on:
the friction torque of at least one of the input side or the output side of the joint transmission; and
the robot joint transmission torque between the input side and the output side of the joint transmission.

2. The method of claim 1, wherein the motor control signal is generated based also on at least one of:
the angular position of the motor axle;
the angular position of the output axle;
the motor torque provided to the motor axle by the joint motor;
a dynamic model of a robot comprising the robotic arm; or
at least one motion parameter corresponding to a desired motion of at least a part of the robotic arm.

3. The method of claim 1, wherein the friction torque of at least one of the input side of the joint transmission or the output side of the joint transmission is obtained based on a deflection of the joint transmission, where the deflection of the joint transmission indicates a difference between the angular position of the motor axle and the angular position of the output axle.

4. The method of claim 1, wherein:
obtaining the angular position of the motor axle comprises measuring the angular position of motor axle using a motor axle encoder; and
obtaining the angular position of the output axle comprises measuring the angular position of the output axle using an output axle encoder.

5. The method of claim 4, wherein the friction torque of at least one of the input side of the joint transmission or the output side of the joint transmission is obtained based on the measured angular position of the motor axle and the measured angular position of the output axle.

6. The method of claim 1, wherein determining the robot joint transmission torque is based on the friction torque of at least one of the input side of the joint transmission or the output side of the joint transmission.

7. The method of claim 1, wherein generating the motor control signal comprises determining a desired transmission torque corresponding to a desired transmission torque of the joint transmission based on:
a dynamic model of a robot comprising the robotic arm;
at least one motion parameter indicating a desired motion of at least a part of the robotic arm; and
the friction torque of at least one of the input side or the output side of the joint transmission.

8. The method of claim 7, wherein generating the motor control signal comprises determining a transmission torque error correction motor torque that minimizes a difference between the desired transmission torque and the robot joint transmission torque ($\hat{\tau}_J$).

9. The method of claim 1, wherein generating the motor control signal for the joint motor comprises determining a desired feed-forward motor torque indicating a desired motor torque of the joint motor based on:
   a dynamic model of a robot comprising the robotic arm;
   at least one motion parameter indicating a desired motion of at least a part of the robotic arm; and
   the friction torque of at least one of the input side or the output side of the joint transmission.

10. The method of claim 1, wherein generating the motor control signal comprises determining an error correction motor torque that minimizes errors associated with least one of:
   a desired motion parameter of the robotic arm and an actual motion parameter of the robotic arm;
   a desired angular position of the output axle and the angular position of the output axle;
   a desired angular velocity of the output axle and an angular velocity of the output axle;
   a desired angular acceleration of the output axle and an angular acceleration of the output axle;
   a desired angular position of the motor axle and the angular position of the motor axle;
   a desired angular velocity of the motor axle and an angular velocity of the motor axle;
   a desired angular acceleration of the motor axle an angular acceleration of the motor axle; or
   a desired torque provided to the motor axle by the joint motor and the motor torque provided to the motor axle by the joint motor.

11. The method of claim 8, wherein generating the motor control signal comprises determining a resulting motor torque corresponding to a resulting motor torque to be applied by the joint motor, the resulting motor torque being based on at least one of:
   the transmission torque error correction motor torque;
   a desired feed-forward motor torque; or
   an error correction motor torque;
   where the motor control signal is generated based on the resulting motor torque.

12. A robot system comprising:
   a controller;
   a robotic arm controlled by the controller, the robotic robot arm comprising joints connecting a base and a tool flange, where at least one of the joints is a rotational joint comprising a joint motor having a motor axle, where the motor axle is configured to rotate an output axle of the rotational joint via a joint transmission;
   wherein controller comprises:
      an adaptive friction module configured to determine a friction torque of at least one of an input side of the joint transmission or an output side of the joint transmission based on at least two of:
         an angular position of the motor axle;
         an angular position of the output axle; or
         a motor torque provided to the motor axle by the joint motor;
      a transmission torque module configured to determine a robot joint transmission torque between the input side and the output side of the joint transmission based on at least one of:
         the angular position of said output axle;
         the angular position of the output axle and the angular position of the motor axle; or
         the angular position of the motor axle and the motor torque provided to the motor axle by the joint motor; and
   wherein the said controller is configured to generate a motor control signal based on the friction torque of at least one of the input side or the output side of the joint transmission and the robot joint transmission torque between the input side and the output side of the joint transmission, and (ii) to control the robotic arm by providing the motor control signal to the joint motor.

13. The robot system of claim 12, wherein the adaptive friction module is configured to determine the friction torque of at least one of the input side of the joint transmission or the output side of the joint transmission based on a deflection of the joint transmission, where the deflection of the joint transmission corresponds to a difference between the angular position of the motor axle and the angular position of the output axle.

14. The robot system of claim 12, further comprising:
   a motor axle encoder configured to measure the angular position of the motor axle; and
   an output encoder configured to measure the angular position of the output axle.

15. The robot system of claim 12, further comprising:
   a sensor configured to obtain the motor torque provided to the motor axle by the joint motor.

16. The robot system of claim 12, wherein the controller comprises a feed-forward controller module configured to determine a desired transmission torque corresponding to a desired transmission torque of the joint transmission based on:
   a dynamic model of a robot comprising the robotic arm;
   at least one motion parameter indicating a desired motion of at least a part of the robotic arm; and
   the friction torque of at least one of the input side or the output side of the joint transmission.

17. The robot system of claim 16, wherein the controller comprises a torque Feed-back controller module configured to determine a transmission torque error correction motor torque that minimizes a difference between the desired transmission torque and the robot joint transmission torque.

18. The robot system of claim 12, wherein the controller comprises a feed-forward controller configured to determine a desired feed-forward motor torque indicating a desired motor torque of the joint motor based on:
   a dynamic model of a robot comprising the robotic arm;
   at least one motion parameter corresponding to a desired motion of at least a part of the robotic arm; and
   the friction torque of at least one of the input side or the output side of the joint transmission.

19. The robot system of claim 12, wherein the controller comprises a feed-back controller configured to determine an error correction motor torque that minimizes errors associated with at least one of:
   a desired motion parameter of the robotic arm and an actual motion parameter of the robotic arm;
   a desired angular position of the output axle and the angular position of the output axle;
   a desired angular velocity of the output axle and an angular velocity of the output axle;
   a desired angular acceleration of the output axle and an angular acceleration of the output axle;
   a desired angular position of the motor axle and the angular position of the motor axle;
   a desired angular velocity of the motor axle and an angular velocity of the motor axle;
   a desired angular acceleration ($\ddot{\Theta}_d$) of the motor axle and an angular acceleration of the motor axle;

a desired torque provided to the motor axle by the joint motor and the motor torque provided the motor axle by the joint motor.

20. The robot system of claim 16, wherein the controller comprises a motor controller module configured to generate the motor control signal corresponding to a motor current for the at least one robot joint based on a resulting motor torque corresponding to a motor torque to be applied by the joint motor, where the resulting motor torque is determined based on at least one of:
   a transmission torque error correction motor torque;
   a desired feed-forward motor torque, or
   an error correction motor torque.

* * * * *